United States Patent
Karc et al.

(10) Patent No.: US 12,022,594 B2
(45) Date of Patent: Jun. 25, 2024

(54) DEVICE FOR POWERING A MODULAR ASSEMBLY

(71) Applicant: Lutron Technology Company LLC, Coopersburg, PA (US)

(72) Inventors: Jeffrey Karc, Danielsville, PA (US); Galen E. Knode, Macungie, PA (US); Rhodes B. Baker, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 342 days.

(21) Appl. No.: 17/572,235

(22) Filed: Jan. 10, 2022

(65) Prior Publication Data
US 2022/0210896 A1 Jun. 30, 2022

Related U.S. Application Data

(63) Continuation of application No. 16/243,826, filed on Jan. 9, 2019, now Pat. No. 11,224,112.
(Continued)

(51) Int. Cl.
*H02G 3/08* (2006.01)
*H01R 13/447* (2006.01)
(Continued)

(52) U.S. Cl.
CPC ........... *H05B 47/19* (2020.01); *H01R 13/447* (2013.01); *H01R 13/6675* (2013.01);
(Continued)

(58) Field of Classification Search
CPC ...... H05B 47/19; H05B 47/12; H05B 47/195; H01R 13/447; H01R 13/6675;
(Continued)

(56) References Cited

U.S. PATENT DOCUMENTS 4,165,443 A 8/1979 Figart et al.
4,875,800 A 10/1989 Hicks
(Continued)

FOREIGN PATENT DOCUMENTS

DE 9214324 U1 12/1992
DE 102014103687 B3 7/2015
(Continued)

OTHER PUBLICATIONS

"Power Draw Units (PDUs) on the QS Link". Lutron Electronics Co., Inc. Oct. 5, 2016, 5 pages.
(Continued)

*Primary Examiner* — Angel R Estrada
(74) *Attorney, Agent, or Firm* — Michael S. Czarnecki; Glen R. Farbanish; Philip N. Smith

(57) ABSTRACT

A wall-mounted assembly may include one or more host devices which receive line voltage and generate low voltage power on one or more contacts for powering one or more modular devices. The one or more modular devices may be installed adjacent to the host device and may share a faceplate with the host device, such as a standard decorator faceplate. The modular devices may receive power from the host device via a power bus between the host device and the one or more modular devices. Further, the power bus may include a communication bus for communication between the host device and the modular devices. The faceplate may be a smart faceplate, which may include circuitry, such as a battery backup, occupancy sensing, a charging dock for a mobile phone, etc.

26 Claims, 20 Drawing Sheets

Related U.S. Application Data

(60) Provisional application No. 62/615,149, filed on Jan. 9, 2018.

(51) Int. Cl.
| | |
|---|---|
| *H01R 13/66* | (2006.01) |
| *H02G 3/12* | (2006.01) |
| *H02G 3/16* | (2006.01) |
| *H02J 7/00* | (2006.01) |
| *H05B 47/12* | (2020.01) |
| *H05B 47/19* | (2020.01) |
| *H05B 47/195* | (2020.01) |

(52) U.S. Cl.
CPC ............ *H01R 13/6683* (2013.01); *H02G 3/08* (2013.01); *H02G 3/121* (2013.01); *H02G 3/16* (2013.01); *H02J 7/0042* (2013.01); *H05B 47/12* (2020.01); *H02G 3/086* (2013.01); *H05B 47/195* (2020.01)

(58) Field of Classification Search
CPC ...... H01R 13/6683; H02G 3/08; H02G 3/121; H02G 3/16; H02G 3/086; H02J 7/0042; H05K 5/00; H05K 5/02; H05K 7/00; H05K 7/14; H05K 7/1472; H05K 7/1432; H05K 7/1427
USPC ........... 174/53, 50, 57, 58, 66, 67, 480, 481; 220/3.2–3.9, 4.02, 241, 242; 361/600, 361/601
See application file for complete search history.

(56) References Cited

U.S. PATENT DOCUMENTS

| | | |
|---|---|---|
| 5,961,345 A | 10/1999 | Finn et al. |
| 6,617,511 B2 | 9/2003 | Schultz et al. |
| 6,932,624 B1 | 8/2005 | Hoopes et al. |
| 6,937,461 B1 | 8/2005 | Donahue, IV |
| 6,945,815 B1 | 9/2005 | Mullally |
| 7,641,491 B2 | 1/2010 | Altonen et al. |
| 8,415,561 B2 | 4/2013 | Gates et al. |
| 8,559,167 B1 | 10/2013 | Czarnecki |
| 9,167,666 B1 | 10/2015 | Billheimer et al. |
| 9,362,728 B2 | 6/2016 | Smith et al. |
| 9,432,084 B2 | 8/2016 | Dearing et al. |
| 9,620,945 B2 | 4/2017 | Rohmer et al. |
| 9,699,864 B2 | 7/2017 | Camden et al. |
| 10,069,235 B2 | 9/2018 | Blase et al. |
| 10,923,896 B2 | 2/2021 | Hodges et al. |
| 11,224,112 B2 * | 1/2022 | Karc .................... H02J 7/0042 |
| 2011/0267802 A1 | 11/2011 | Petrillo |
| 2015/0189725 A1 | 7/2015 | Karc et al. |
| 2017/0188437 A1 | 6/2017 | Banta |
| 2017/0237173 A1 | 8/2017 | Bhutani et al. |
| 2018/0252588 A1 | 9/2018 | Fadell et al. |

FOREIGN PATENT DOCUMENTS

| | | |
|---|---|---|
| EP | 0452658 B1 | 11/1994 |
| EP | 2043123 A2 | 4/2009 |
| EP | 2395627 A1 | 12/2011 |
| EP | 3091549 A1 | 11/2016 |

OTHER PUBLICATIONS

"RK1+ In-Wall Keypad Quick Reference Guide", Remote Technologies Incorporated, 2014, 2 pages.

* cited by examiner

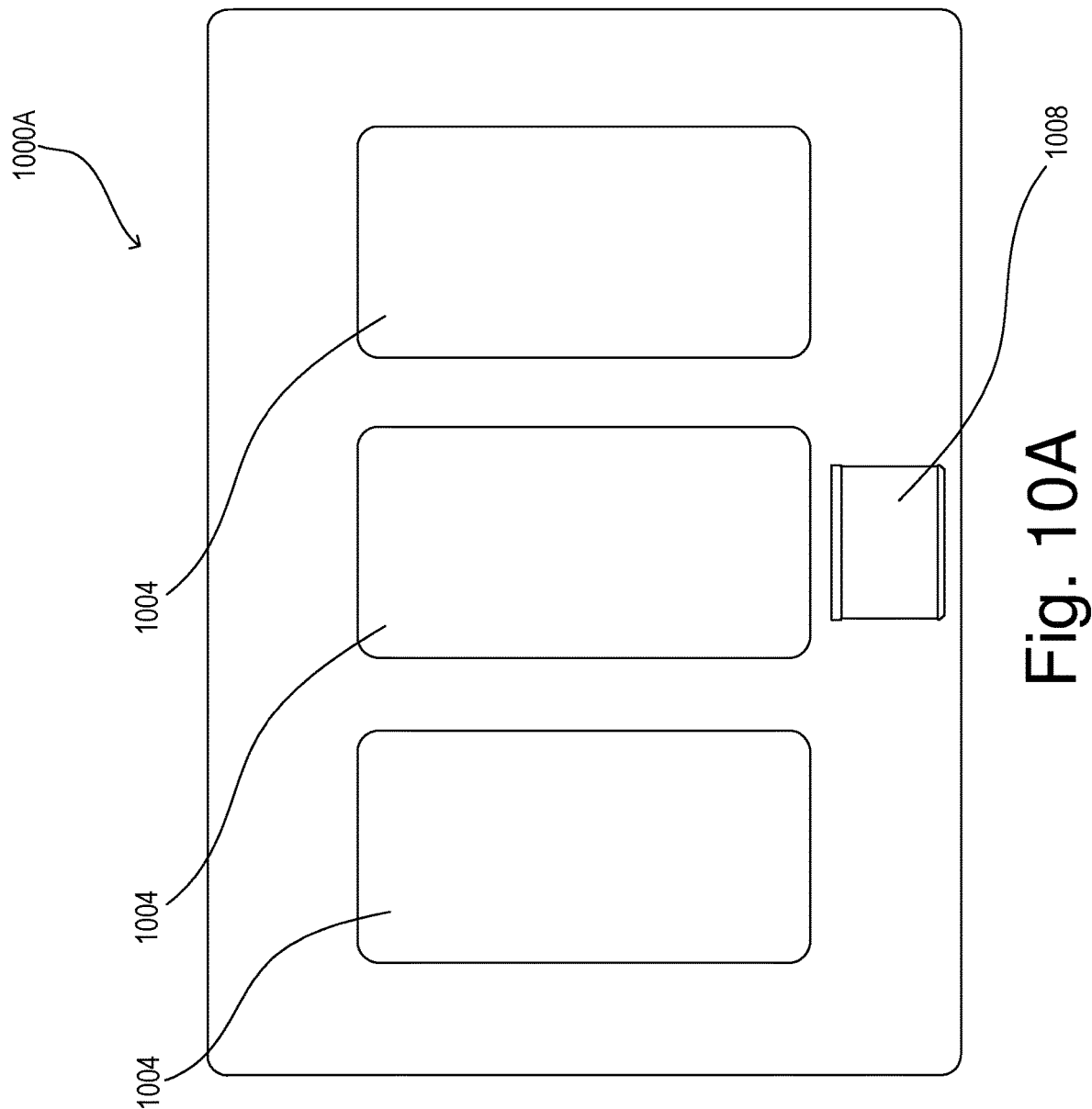

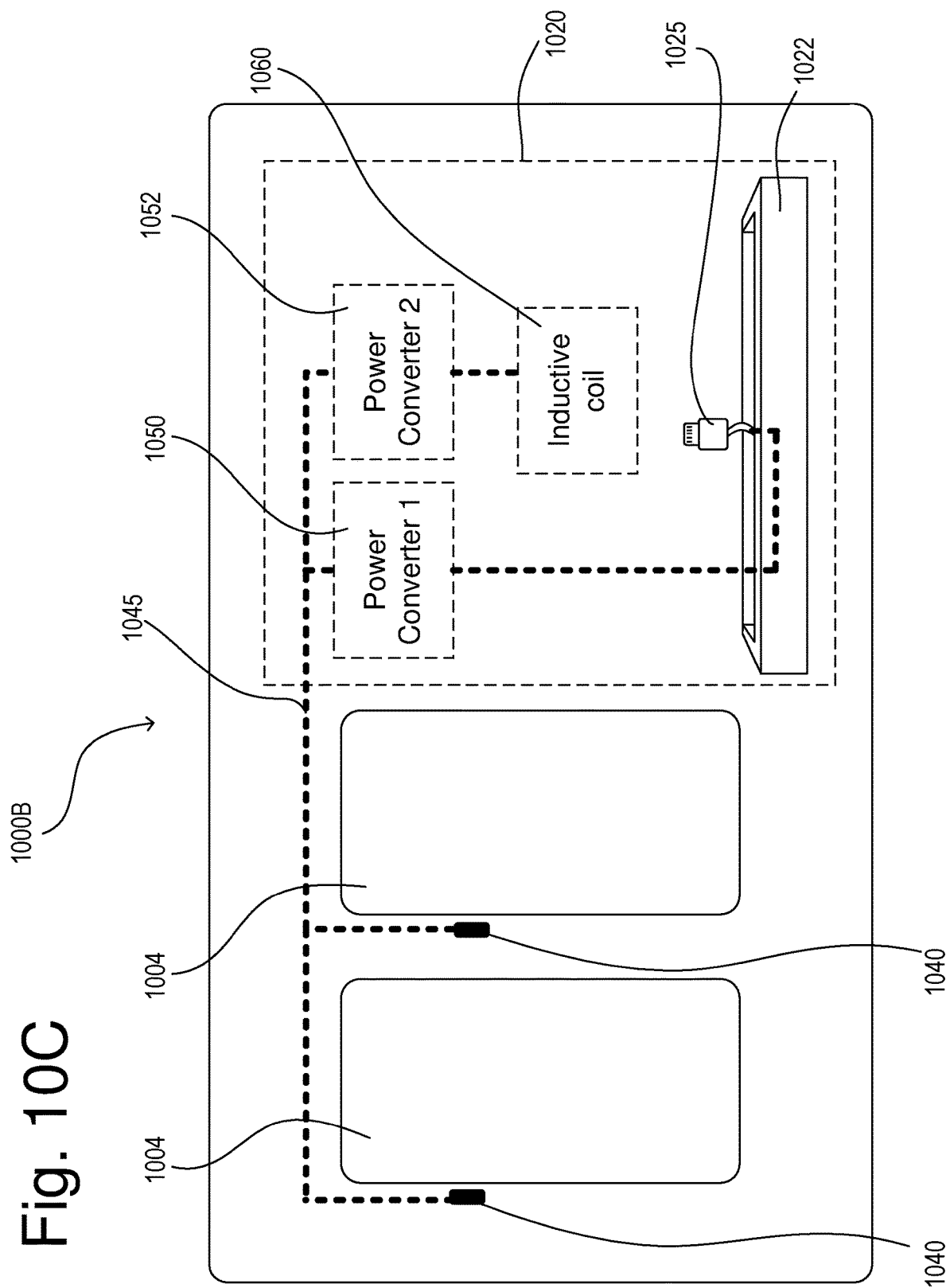

DEVICE FOR POWERING A MODULAR ASSEMBLY

CROSS-REFERENCE TO RELATED APPLICATIONS

This application is a continuation of U.S. patent application Ser. No. 16/243,826, filed Jan. 9, 2019, which claims the benefit of U.S. Provisional Patent Application No. 62/615,149, filed Jan. 9, 2018, the disclosures of which are hereby incorporated by reference herein in their entirety.

BACKGROUND

Home automation systems, or "smart homes", have electrical loads and/or electronic smart devices located within a home which may be controlled by a user in a remote location from the devices. For example, a homeowner may connect appliances, lights, window treatments, thermostats, cable or satellite boxes, security systems, telecommunication systems, and other devices to each other via a wireless network. The homeowner may control these devices using a controller or user interface provided via a smart phone, a tablet, a computer, or other device directly connected to the network or remotely connected via the Internet, which may include touch, voice, or gesture inputs from the user. These devices may communicate with each other and the controller to improve their efficiency, their convenience, and/or their usability.

One drawback of smart home integration and the addition of smart devices, specifically, is where to place smart devices in the home. It would be advantageous to have smart devices that could be installed without taking up appreciable table space, occupying electrical receptacles, or adding clutter to the walls and ceiling which may detract from the aesthetics of the home.

SUMMARY

The electrical wallbox offers a unique advantage as an installation location. In addition to having a location in every room of a residence or commercial space, the electrical wallbox is both a familiar control location to users, and has line voltage available for electrical power. An embodiment described herein is a load control device installed in an electrical wallbox and wired to line voltage, such as an alternating current (AC) line voltage, wherein the load control device supplies low-voltage power to other modular devices (i.e., the load control device acts as a host device). The modular devices may be installed adjacent to the load control device, either within the electrical wallbox or outside the electrical wallbox. The low voltage power may also be supplied through a faceplate shared by the host device and the modular devices.

This modular design concept offers several advantages over traditional installation methods. Firstly, the modular design provides a uniform aesthetic, whereby each modular device fits inside the same form-factor, namely, the opening of a standard faceplate, e.g., a decorator faceplate. Secondly, the modular design is powered by low voltage received from a host device (i.e., a device which provides power to the modular device), which not only reduces cost through eliminating AC to DC conversion (as necessary for line voltage powered devices), but also introduces scalability. Because the modular devices are powered with low voltage, users who are uncomfortable with line voltage wiring may add additional devices as desired and slowly upgrade their system over time, without requiring an electrician to install the modular devices for each upgrade. Additionally, devices which may previously have occupied electrical outlets and valuable table and/or countertop space could now be succinctly installed in the same location at the electrical wallbox. And, devices which were previously battery powered could have a simple method of receiving low voltage power, eliminating the need to replace batteries over the device's lifetime.

The modular devices may be installed with a standard faceplate, or the faceplate may include wiring means by which to power the modular devices. Additionally, the faceplate may be a smart faceplate, and may include functionality which may otherwise have been included in any one or several of the modular devices. For example, the faceplate and/or the modular devices may include one or sensors, such as occupancy sensors, a switch, a dimmer, a temperature control device, a keypad, a camera, a doorbell, an audio device, a wireless charging dock, etc. The platform established herein may be used by third parties as a platform for modular devices.

FIGURES

FIGS. 10A-10C are front views of alternate embodiments of example smart faceplates with integrated occupancy sensing and wireless mobile device charging.

DETAILED DESCRIPTION

Figure 1:
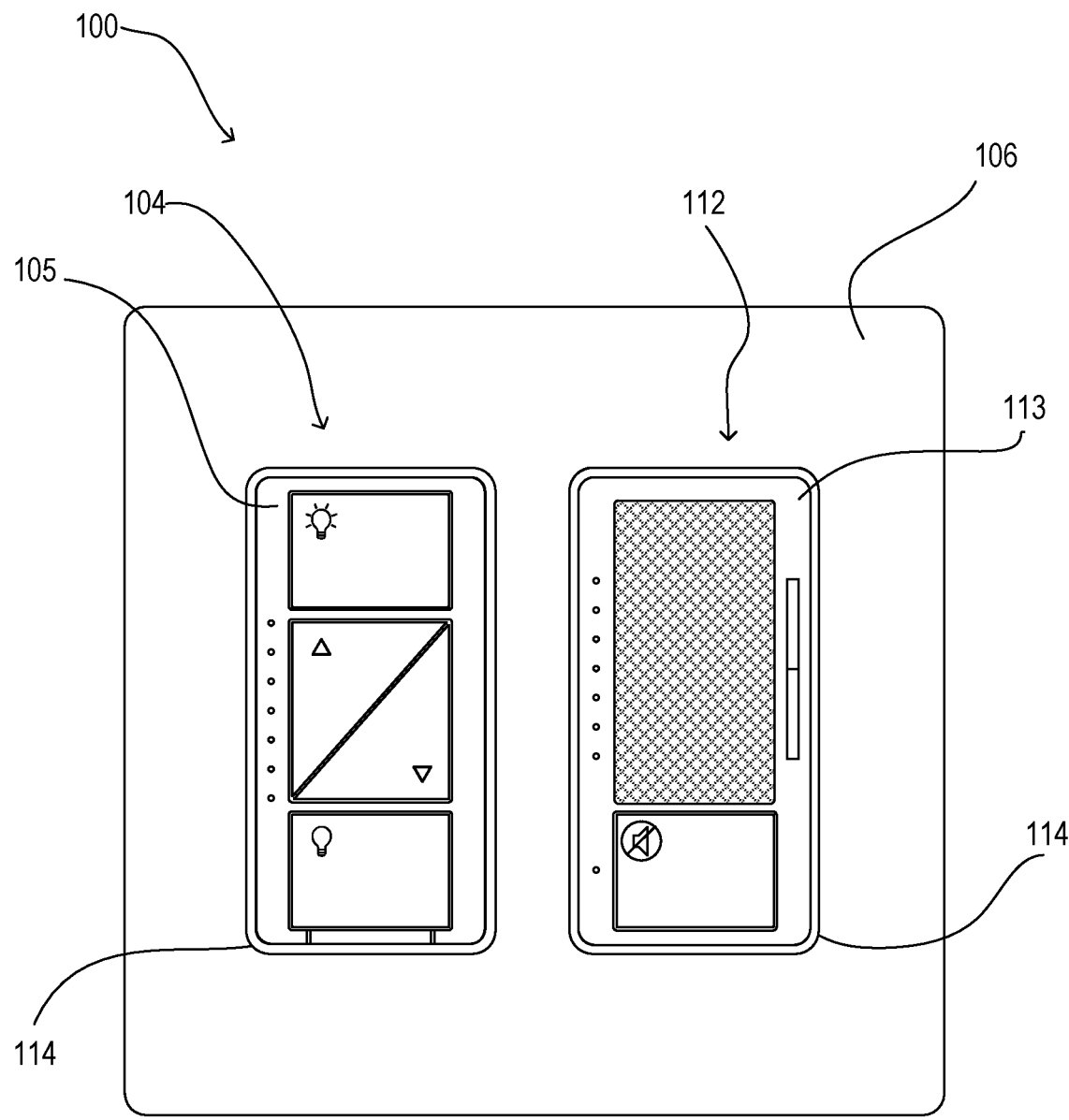
FIG. 1 shows a multi-gang wall installation of an example host device and a modular device.

FIG. 1 is a front view of an example multi-gang wall installation 100. The multi-gang wall installation may include a faceplate 106, shown here as a front side of the faceplate 106. The multi-gang wall installation may also include a host device 104 and a modular device 112. The host device may be any wall-mounted electrical device which may be installed in an electrical wallbox and receive power from a line voltage. For example, the host device may be coupled to line voltage wiring in the electrical wallbox and receive 120V AC power from the line voltage wiring. The host device 104 may provide power to device 112. For example, the host device may provide line voltage power (120V AC), some other AC voltage lower than line voltage, DC voltage, low voltage DC, or a combination of AC/DC voltage. For the purposes of this discussion, the host device may provide a low voltage output. The host device may further include a power supply, for example, that converts the line voltage to a low voltage output (e.g., Class 2 output) and provides the low voltage output on one or more connectors (not shown), which may be used to power other devices, such as the modular device 112. Specifically, the modular device 112 may also include one or more connectors that are electrically connected to the one or more connectors of the host device and receive power from the power supply of the host device.

The host device 104 and the modular device 112 may each have a surface, shown as 105 and 113, respectively. The surface may be an area accessible to a user when a faceplate 106 is installed. For example, the faceplate 106 may have one or more openings 114 through which device 104 and 112 may protrude such that the surface 105 and the surface 113 are exposed to a user. The faceplate 106 may provide an aesthetic cover over the remaining portions of the host device 104 and the modular device 112, and only expose the surface of the host device and the surface of the modular device, as described. The faceplate 106 may be made of plastic, or other materials such as metal, wood, glass, or other suitable materials, and/or may contain veneers.

Figure 2:
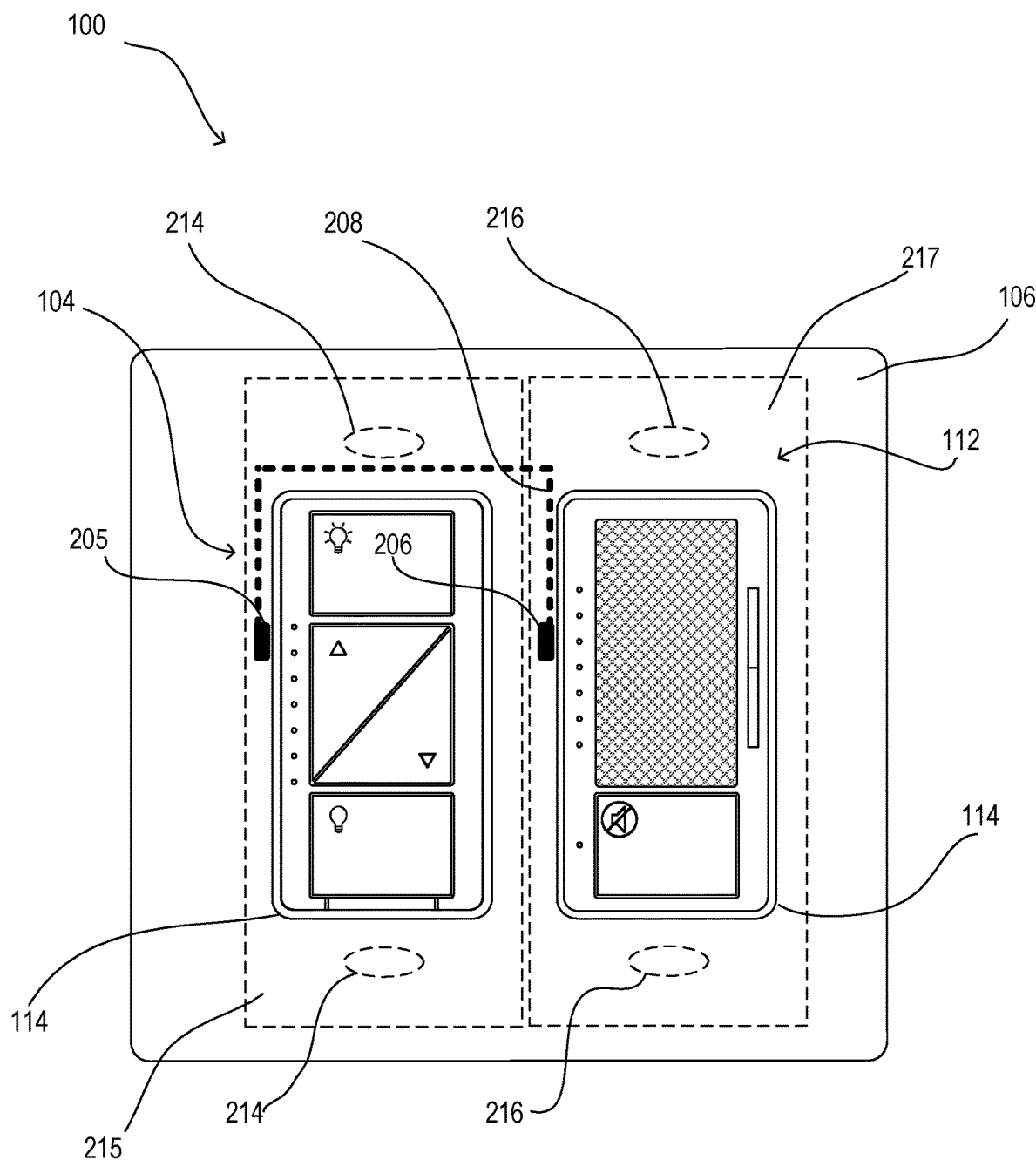
FIG. 2 is a transparent front view of the multi-gang installation shown in FIG. 1 with wiring and mounting structures shown in dashed lines.

FIG. 2 is a transparent front view of the multi-gang installation 100 shown in FIG. 1 with portions of the devices 104 and 112 which are located behind the faceplate 106, such as power wiring and mechanical mounting structures, shown in dashed lines. The host device 104 may include a yoke 215. The host device may be mounted to the electrical wallbox via one or more screws inserted through mounting holes 214 located on the yoke 215, although other mechanisms may be used. The yoke may be constructed of metal, plastic, or the like.

The host device may generate power for powering the modular device 112. For example, the host device may provide low voltage power to a power terminal of the host device. The power terminal of the host device may contain one or more contacts, for example, a power contact and a ground contact. The contacts may be electrically isolated, i.e., not electrically connected. The contacts of the power terminal of the host device may mate with respective contacts of a terminal of the power supply bus to create the mating terminal 205, as shown in FIG. 2. The installation 100 may include a power supply bus 208 which may transfer the low voltage power from the host device at mating terminal 205 to the modular device at mating terminal 206. The mating terminal 206 may receive low voltage power via a power supply bus 208 and power the modular device from the received low voltage power. The modular device 112 may be powered solely by the power received through the power supply bus 208 and generated by the host device, i.e., the modular device may not be wired to line voltage and/or may not include a battery supply source. The mating terminal 206 may be similar to the mating terminal 205, wherein the modular device may have a similar power terminal to the power terminal of the host device, which may mate with a second terminal of the power supply bus to create mating terminal 206.

The modular device 112 may be installed adjacent to the host device and may share the faceplate 106 with the host device. The modular device may also include a yoke 217 and mounting holes 216, and may be installed/mounted in an electrical wallbox via one or more screws through the mounting holes 216, similar to device 104. Alternatively, the modular device may not be installed in an electrical wallbox, but rather, may be installed in front of a wall adjacent to the electrical wallbox and behind the faceplate 106. Here, device 112 may not include yoke 217.

As the modular device may receive power from the host device through the power supply bus 208, the modular device may not need a dedicated power supply to convert line voltage power to a low voltage supply, for example. Therefore, the modular device may be provided at a lower cost than a similar device which is powered by AC line voltage. The configuration of a host device and a modular device may also provide a clean installation look, wherein additional modular devices may be added which appear to be installed in an electrical wallbox, and do not consume valuable outlet and/or table space in the room. Modular devices may include such devices as temperature sensors, occupancy sensors, speakers, RF communication, etc.

The modular device 112 may be attached to the wall through various means. For example, as described, the modular device may be attached to an electrical wallbox. However, if there is no additional space in the electrical wallbox, the modular device(s) may be attached directly to the wall. For example, the modular device may be mounted to the wall via screws into a drywall anchor through one or more holes 216 in the modular device. Alternatively, the modular device may be attached via an adhesive material. For example, the modular device may be attached to the wall using adhesive strips such as 3M™ strips, hook fasteners such as VELCRO®, magnets, etc.

The host device and modular device may be sized and spaced appropriately to fit within the openings 114 of the faceplate 106. The spacing between the devices may be established in several ways. For example, the width of the yokes 217, 215 of the modular device and host device may set the spacing. For example, the modular device and the host device may be placed adjacent to each other such that the yoke 217 of the modular device touches (i.e., physically abuts) the yoke 215 of the host device to provide the appropriate spacing such that the modular device and the host device fit within the correct spacing of the faceplate openings 114.

Alternatively, the user may use an adapter plate which connects to the wall to set the spacing and sufficiently align the devices, for example. This may be achieved using alignment pins and a hole. For example, the modular and host devices may contain a small alignment pin (or pins) which may mate with corresponding holes in the adapter plate. For the adapter plate to fit over the modular and host devices, the modular and host devices must be appropriately spaced such that the alignment pins on these devices mate with the holes in the adapter, thus aligning the devices. One will recognize that the alignment pins could be located on any or each of the adapter, host, and modular devices, as well as the holes, provided that in the aligned condition the alignment pins meet with the corresponding holes. The adapter may be used temporarily, specifically to install and align the host and modular devices, or the adapter may be used as a carrier to which the faceplate may attach. For example, the faceplate may then adhere to the adapter plate via one or more snaps, magnets, etc., to aesthetically cover the alignment pins, screws, and other mechanical features of the adapter.

Figure 3:
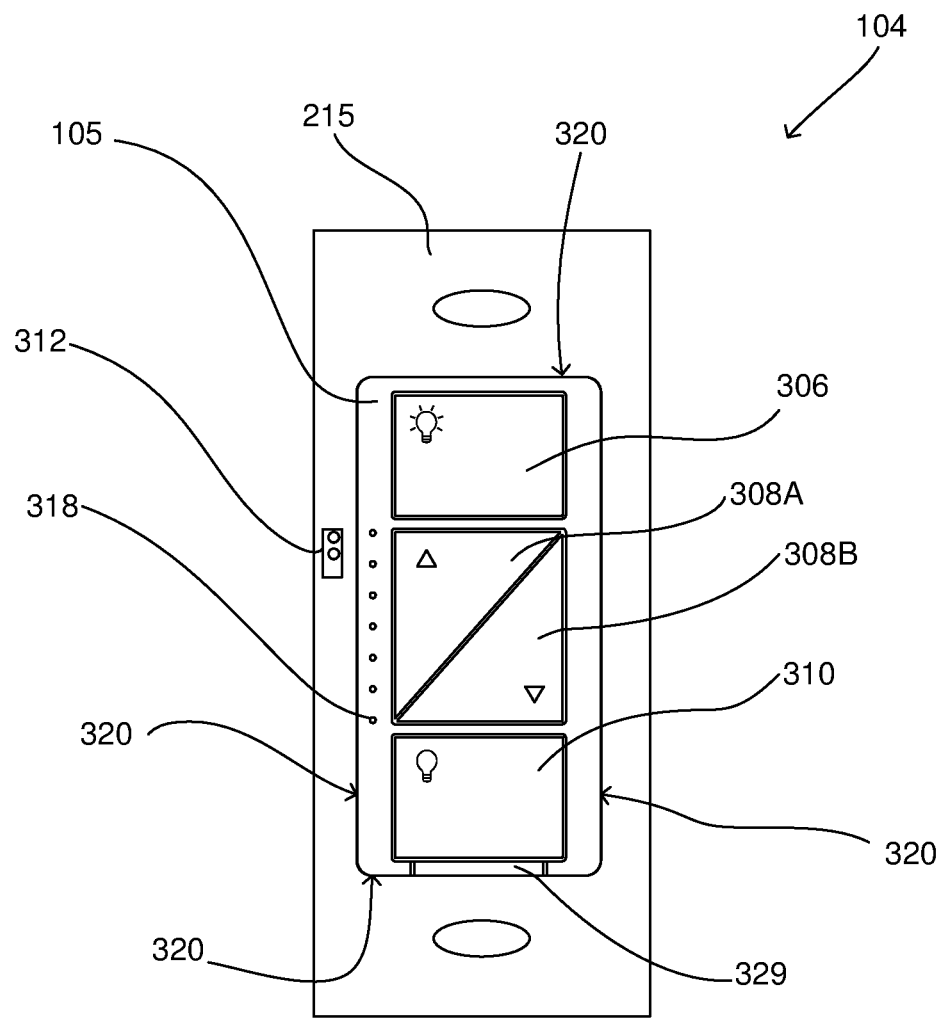
FIG. 3 is a front view of the example host device shown in FIG. 1 that provides power to downstream modular devices.

FIG. 3 is a front view of the example host device 104 shown in FIGS. 1 and 2. The host device may additionally be a load control device electrically wired to one or more electrical loads for controlling power to the electrical loads. For example, the host device may be a lighting control device, such as a dimmer switch, which controls power to a lighting load. Or, the host device may be a keypad, containing one or more buttons for controlling multiple electrical loads. Alternatively, the host device may be a load control device that controls any one of, or a combination of, the movement of a motorized window treatment, an HVAC system, a fan speed, a voice control or audio device, etc.

The host device 104 may contain a surface 105, (i.e., a front surface), which may protrude through the opening 114 of a faceplate when installed with a faceplate, such that the surface 105 may be accessible to a user when the faceplate is installed. The surface 105 may contain a user interface such as one or more buttons or a capacitive touch screen or area. A user may interact with the user interface to control one or more electrical loads. As described previously, the host device may be any one of a dimmer, switch, keypad, etc. However, one skilled in the art will recognize that the host device need not contain a user interface or load control functionality in order to provide power to modular devices. In other words, the host device may only function as interfacing with line power and providing power to modular devices.

A user may interact with the host device via the user interface on the surface 105. The user interface may include one or more buttons. For example, the host device of FIG. 3 is shown as a lighting control device, wherein the host device 104 may control one or more lighting loads in response to action of one or more buttons located on the user interface on the surface 105. As shown, the user interface 302 may include an "on" button 306, and "off" button 310, and dimming buttons 308A, 308B. The host device may change an intensity of a respective lighting load in response to an actuation of any of the buttons 306-310. For example, a user may press the "on" button 306 to turn on the lighting load, and/or the "off" button 310 to turn off the lighting load. Further, when a user presses the dim up button 308A, the host device 104 may increase the intensity of the lighting load, and in response to a user pressing the dim down button 310, the host device may decrease the intensity of the lighting load.

The host device 104 may be configured to provide feedback to a user concerning the intensity or lighting level of the lighting loads. For example, the host device may contain one or more light emitting diodes (LEDs) 318. The LEDs may be displayed in a linear array, as shown in FIG. 3, or in another fashion. The LEDs 318 may light up to indicate to a user the intensity of the lighting load. For example, the LED array 318 is depicted as having seven LEDs. One will recognize the LED array 318 may include more or fewer numbers of LEDs. For example, for a lighting intensity of 100%, all LEDs in the LED array 318 may turn on. For example, for a lighting intensity of 30%, only the bottom two LEDs in the LED array 318 may turn on.

The host device may also contain an airgap actuator 329. The airgap actuator 329 may contain a mechanical mechanism that may be either pulled out or pushed in by a user. The airgap actuator 329 may allow a user to mechanically disconnect line power to the device via the mechanical mechanism. For example, a user may pull out the airgap actuator 329 to remove line power to the host device, and therefore, additionally remove power to the lighting load and the power supply bus. This may be used, for example, for replacing a lightbulb of the lighting load without the need to turn off the circuit breaker. One will recognize that other airgap mechanisms may be used, and further, that the airgap actuator 329 is not specific to a lighting control device, but may be used on any host device. For example, a user may pull out or disengage the airgap actuator 329 to turn off power to the host device when a user wishes to install a modular device. Disengaging the airgap actuator 329 may also remove power from any connected modular devices. Examples of airgaps for electrical load control devices, such as the one shown here, are described in greater detail in U.S. Pat. No. 7,365,282, issued Apr. 29, 2008, entitled "PULL OUT AIR GAP SWITCH FOR WALLBOX-MOUNTED DIMMER", the entire disclosure of which is herein incorporated by reference.

The host device may have a power terminal 312, for example, which may be connected to the mating terminal 205 of the faceplate 106 in FIG. 2. The power terminal 312 may be used to connect the host device to the power supply bus 208 (not shown) via the mating terminal of the power supply bus to provide power to the power supply bus. The power terminal 312 of the host device may have two or more contacts, each corresponding to a respective contact of the power supply bus 208. For example, the power terminal 312 may include at least a power contact and a ground contact. The contacts may be co-located in the power terminal 312 and mechanically equivalent. The power supply bus 208 may include two or more separate isolated buses including a power bus and a ground bus that supply at least a power and a ground connection from the host device to an adjacent modular device via the power and ground contacts of the power terminal 312. The host device may supply power to the power bus of the power supply bus 208 via the power contact on the power terminal 312. The host device may supply ground to the ground bus of the power supply bus 208 via the ground contact on the power terminal 312.

The ground contact of the power terminal 312 of the host device may be connected to a circuit common or ground of the low voltage power supply that provides power to the power supply bus 208 and thus to the modular device. That is, the ground connection between the host and modular device may be made through a ground bus of the power supply bus 208 as described previously. Alternatively, the ground connection (i.e., the ground bus) may be made through the yoke 215 and the yoke 217, provided that the yokes 215, 217 are in electrical contact when the modular device 112 is installed adjacent to the host device 104. For example, a ground connection may be established through the yoke 215, if the yoke is conductive and in electrical connection with circuit common of the host device. The yoke 215 may then physically abut the yoke 217 of the modular device to create the ground bus.

The power terminal 312 may be located on a portion of the host device that is readily accessible when the faceplate is removed without the need to remove the host device from the electrical wallbox. This may allow a user to easily connect additional modular devices powered from the host device. For example, the power terminal 312 may be located on a front-facing portion of the yoke 215 (e.g., on a same side as surface 105), as shown, and the power and ground contacts of the terminal 312 may connect to respective power and ground outputs of the low voltage power supply of the host device 104 through an opening (not shown) in the yoke 215 into which the power terminal 312 has been placed and/or protrudes. Additionally, the surface 105 containing the user interface may protrude out from the yoke 215. For example, the surface 105 may protrude out from the yoke 215 by approximately 0.2-0.4 inches, for example, 0.25 inches. Thus, the surface 105 may contain sides 320. The power terminal 312 may alternatively be located on any of the sides 320 of the host device.

Although the power terminal 312 has been described as located on the yoke 215 or on one of the sides 320 of the host device, one will understand that the power terminal 312 may be located on any area of the host device 104 that does not include the surface 105, such that the contacts of the power terminal 312 may not be accessible to a user when the faceplate is installed. For example, the power terminal may be located in a region covered by the faceplate when the faceplate is installed, such that a user may not be able to touch the power terminal. For example, the host device may have a front surface. The front surface may contain two separate areas. The first area may be the surface 105 containing the user interface that is exposed by the opening in the faceplate. The second area may be the area that is covered when the faceplate is installed over the host device 104, and exposed when the faceplate is removed (including, for example, the yoke 215 and the sides 320). As described, the power terminal 312 may be located in the second area.

Additionally, a user may not be able to touch the contact(s) of the power terminal 312 while the host device is powered and the faceplate is removed. According to one embodiment, the power and/or ground contact may be recessed within the power terminal 312. For example, the power terminal 312 may be a female connector wherein the power contact is a recessed socket within the power terminal. The power contact may receive a pin or post from a mating connector of the power bus of the power supply bus 208.

Alternatively, the entire power terminal 312 may be recessed from a surface of the host device. For example, the power terminal may contain contacts which are metal pins, posts, sockets, etc., which are recessed from a surface of the host device through an opening (not shown). The area of the opening through which the contacts may be accessed may be sufficiently small such that a user cannot physically fit a finger in the recess to touch the contacts. For example, the mating terminal or contacts of the mating terminal of the power supply bus may depress into the recession on the surface of the host device to mate with the power contact (and ground contact) of the power terminal 312. Alternatively, the yoke 215 may provide a ground connection, as discussed previously.

Alternatively, the contacts of the power terminal 312, or the entire terminal 312, may extend/protrude from a housing of the terminal 312 of the host device to mate with the mating terminal of the power supply bus when a faceplate or an adapter (that is, a receiving carrier for a faceplate, as previously described) is installed on the host device. For example, the power supply bus 208 and connected mating terminals of the power supply bus may be attached to the faceplate or adapter in an assembly. The power terminal 312 may be a pin or pins which are retracted or recessed within the front surface when the front surface is exposed to the user. A post or key on the faceplate or adapter may engage with a corresponding hole or pin on the host device 104 near the power terminal 312, which when engaged, may allow the power terminal 312 (or one or more contacts of the power terminal 312) to extend away from the housing of the terminal 312 to mate with the mating power contact on the terminal of the power supply bus 208 of the faceplate or adapter assembly. The engagement of the key may be required for the contact pins or connections to protrude away from the housing of the terminal 312, such that the power contact pin is only extended when the faceplate or adapter is covering the power contact, and the power contact is therefore not accessible to a user.

Alternatively, the power contact of the power terminal 312 may be a conductive spring, finger, pogo-pin or other protrusion which makes electrical contact with the corresponding contact of the mating terminal of the power supply bus. Or, any or a combination of these electrical contacts may be used with a magnet.

In another embodiment, the power contact of the power terminal 312 may be an isolated power connection. For example, the power contact may apply power inductively, capacitively, optically (photovoltaic or infrared), etc., such that the power contact is isolated from a user and/or substantially covered by a non-conductive material (such as plastic). For example, the power supply bus 208 of FIG. 2 may be attached or adhered to a faceplate and/or faceplate adapter. The power contact of the power terminal 312 may have an inductive coil which transfers power to a mating inductive coil on the faceplate or adapter when the mating inductive coil is in proximity to and aligned with the power contact inductive coil. The mating inductive coil may be in electrical connection with the power supply bus such that power may be transferred from the host device to the modular device via the inductive coil of the power terminal 312 of the host device, to the mating inductive coil on the faceplate or adapter, through the power supply bus 208 which the mating inductive coil is electrically connected to, to a second mating power terminal in contact with the power terminal of the modular device, which may also be an inductive coil power transfer connection.

The power terminal 312 may be constructed according to any of these methods described, and additionally the housing of the power terminal 312 may include an insulative protruding feature around or near the contacts so as to prevent shorting of the power and ground contacts, for example, when a metal faceplate is installed on the host device.

Figure 4:
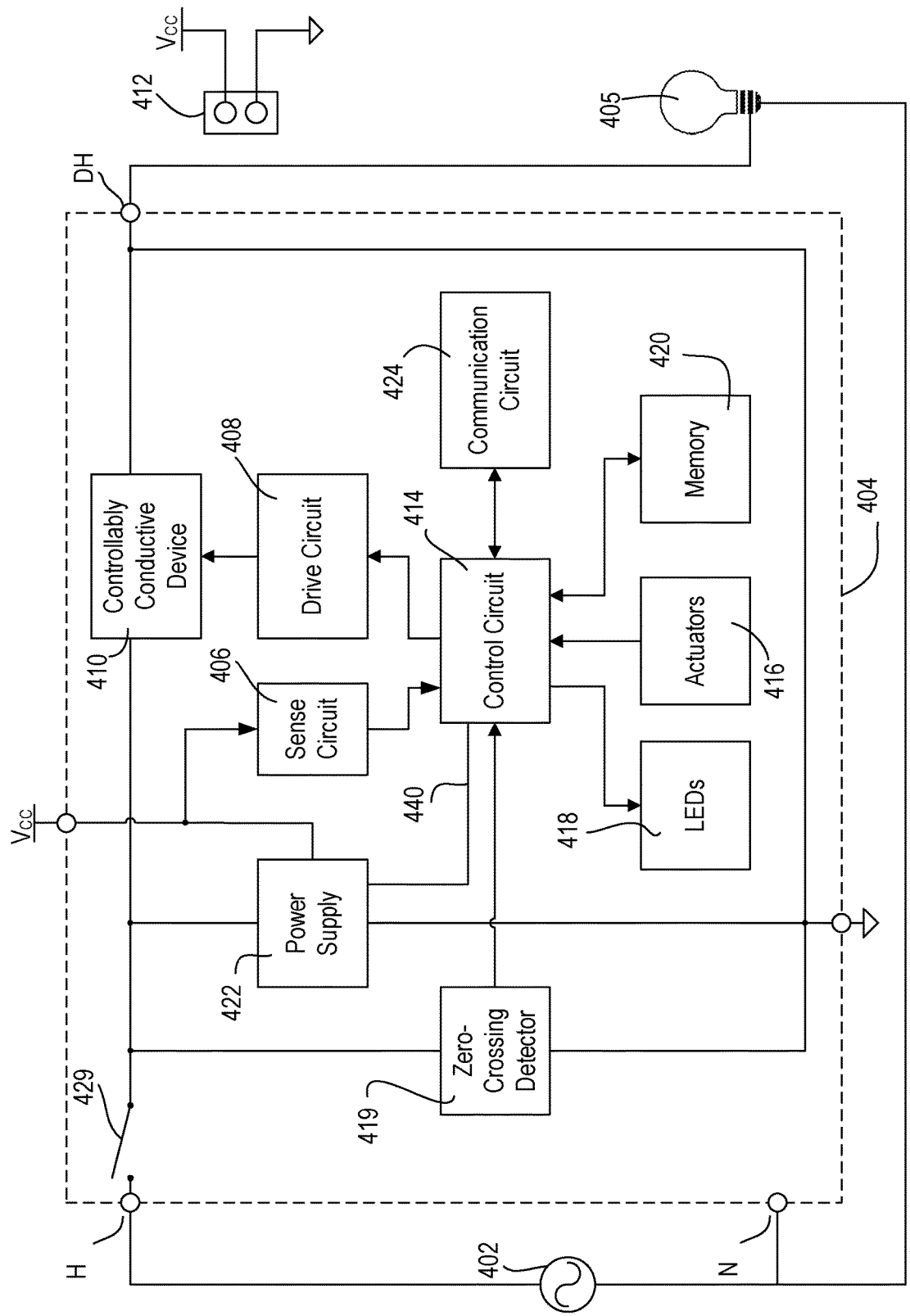
FIG. 4 is a simplified block diagram of the example host device of FIG. 3.

FIG. 4 is a block diagram of an example host device 404, which may be the host device 104 shown in FIGS. 1-3. The host device 404 may be a load control device and may include a hot terminal H that may be adapted to be coupled to an AC power source 402, such as a line voltage power source. The host device may have a neutral terminal, N, which may be connected to a neutral wire of the line voltage power source. The host device may also have a dimmed hot terminal DH that may be adapted to be coupled to an electrical load, such as a lighting load 405. The H, N, and DH terminals may be screw terminals, push-in type line voltage connections, or insulated wires of appropriate size gauge (for example, for line voltage of 120V, between and including 12 or 16-gauge wire). Although the host device 404 is shown here with a neutral and dimmed hot connections, one will understand that the host device may have only a hot connection and one other connection, either neutral or dimmed hot. For example, the host device 404 may only have a hot connection H and a dimmed hot connection DH, and may generate power through the series loop between the AC power source 402, the host device 404, and the lighting load 405. Alternatively, the host device may not be a lighting control device, and may only have a hot H connection and a neutral N connection, and no dimmed hot DH connection.

The host device 404 may have a controllably conductive device 410 coupled in series electrical connection between the AC power source 402 and the lighting load 405. The controllably conductive device 410 may control the power delivered to the lighting load. The controllably conductive device 410 may include any suitable type of bidirectional semiconductor switch, such as, for example, a triac, a field-effect transistor (FET) in a rectifier bridge, two FETs in anti-series connection, or one or more insulated-gate bipolar junction transistors (IGBTs). An air-gap switch 429 may be coupled in series with the controllably conductive device 410. The air-gap switch 429 may be opened and closed in response to actuations of an air-gap actuator. When the air-gap switch 429 is closed, the controllably conductive device 410 is operable to conduct current to the load. When the air-gap switch 429 is open, the host device and the lighting load 405 may be disconnected from the AC power source 402.

The host device 404 may include a control circuit 414. The control circuit 414 may include one or more of a processor(s) (e.g., a microprocessor(s)), a microcontroller(s), a programmable logic device(s) (PLD), a field programmable gate array(s) (FPGA), an application specific integrated circuit(s) (ASIC), or any suitable controller(s) or processing device(s). The control circuit 414 may be operatively coupled to a control input of the controllably conductive device 410, for example, via a gate drive circuit 408. The control circuit 414 may be used for rendering the controllably conductive device 410 conductive or non-conductive, for example, to control the amount of power delivered to the lighting load 405. The control circuit 414 may receive user inputs from one or more actuator(s) 416 (such as actuators 306, 308A/B, and/or 310 shown in FIG. 3). The control circuit 414 may individually control LEDs 418 (which may be similar to LEDs 318 of FIG. 3) to illuminate visual indicators and provide feedback to the user.

The control circuit 414 may receive a control signal representative of the zero-crossing points of the AC main line voltage of the AC power source 402 from a zero-crossing detector 419. The control circuit 414 may be operable to render the controllably conductive device 410 conductive and/or non-conductive at predetermined times relative to the zero-crossing points of the AC waveform using a phase-control dimming technique. Examples of dimmers that may be used as a host device 404 are described in greater detail in commonly-assigned U.S. Pat. No. 7,242,150, issued Jul. 10, 2007, entitled DIMMER HAVING A POWER SUPPLY MONITORING CIRCUIT; U.S. Pat. No. 7,546,473, issued Jun. 9, 2009, entitled DIMMER HAVING A MICROPROCESSOR-CONTROLLED POWER SUPPLY; and U.S. Pat. No. 8,664,881, issued Mar. 4, 2014, entitled TWO-WIRE DIMMER SWITCH FOR LOW-POWER LOADS.

The host device 404 may include a communication circuit 424. The communication circuit may be a wireless communication circuit. The communication circuit 424 may include a RF transceiver coupled to an antenna for transmitting and/or receiving RF signals. The control circuit 414 may be coupled to the communication circuit 424 for transmitting and/or receiving digital messages via the RF signals. The control circuit 414 may be operable to control the controllably conductive device 410 to adjust the intensity of the lighting load 404 in response to the digital messages received via the RF signals. The control circuit 414 may transmit feedback information regarding the amount of power being delivered to the lighting load 404 via the digital messages included in the RF signals. The control circuit 414 may be configured to transmit RF signals in response to an actuation of the actuator. The communication circuit 424 may include an RF transmitter for transmitting RF signals, an RF receiver for receiving RF signals, or an infrared (IR) transmitter and/or receiver for transmitting and/or receiving IR signals. One will understand the communication circuit may be other types of circuits, such as being configured to communicate via a wired connection/network.

The host device may have one or more memory modules ("memory") 420 (including volatile and/or non-volatile memory module) that may be non-removable memory modules and/or removable memory modules. The memory 420 may be communicatively coupled to the control circuit 414 for the storage and/or retrieval of, for example, operational settings, such as, lighting presets and associated preset light intensities. The memory 420 may also store software to control the operation of the device where the software is executed by the control circuit. The memory 420 may be implemented as an external integrated circuit (IC) or as an internal circuit of the control circuit 414. Non-removable memory 420 may include random-access memory (RAM), read-only memory (ROM), a hard disk, or any other type of non-removable memory storage. Removable memory 420 may include a subscriber identity module (SIM) card, a memory stick, a memory card, or any other type of removable memory.

The host device 404 may include a power supply 422. The power supply 422 may be coupled in parallel with the controllably conductive device 410. The power supply 422 may be operable to conduct a charging current through the lighting load 405, or through the neutral connection N, to generate the DC supply voltage $V_{CC}$.

Power supply 422 may generate a low voltage power rail, $V_{CC}$, which may be sent to the power terminal 412 (similar to power terminal 312 in FIG. 3) for powering modular devices (e.g., 112). The $V_{CC}$ rail may be either AC or DC and may be power-limited in nature. For example, the $V_{CC}$ rail may be a Class 2 DC output power rail. Low-voltage active circuitry, such as the control circuit 414, and other low-voltage circuitry of the host device 404, may be powered through a power rail separate from the $V_{CC}$ rail (not shown). This other power rail may derive power from the $V_{CC}$ rail either directly or through a linear regulator, resistor divider, or another voltage regulation circuit (which may be included within the power supply 422). Alternatively, the host device may have two separate power supplies (not shown), one for powering the $V_{CC}$ rail and the other for powering internal low voltage circuitry of the host device.

The $V_{CC}$ rail and ground may further be output to the power terminal 412 for powering modular devices. Although $V_{CC}$ is described as a single low voltage power rail, one will recognize that $V_{CC}$ may be multiple power rails having different voltages which are provided to the modular devices. The power supply bus may have a separate bus for each voltage, connected to a separate contact on the terminal 412 for each voltage provided. The power terminal 412 may be the same as power terminal 312 shown in FIG. 3. Additionally, the host device may be a Class 2 power supply according to the standard established by National Electrical Code (NEC), which specifies current and voltage limits to the supply and requires isolation from line voltage.

The output voltage $V_{CC}$ of the power supply 422 may be an AC or DC voltage. The output voltage may be a fixed DC voltage, such as 3.6 volts, or 5 volts, for example, or it may be adjustable based on which modular devices are connected to the host device. While a slightly higher voltage such as 12 volts may allow a reduction in current supplied to the modular devices, voltages of 5 volts or less may reduce circuit complexity for the modular devices. For example, many low voltage control circuits and microprocessors have a maximum voltage input, therefore, reducing the supplied voltage to a level compatible with the control circuits, etc., may either waste power or require extra circuit components.

The host device may be configured to provide power to modular devices up to a specified power limit. The power limit may be set based on the capabilities of the host device power supply 422. For example, the host device may be limited to supplying 0.5 watts of power. For an output voltage of 12V, the host device power supply may supply up to approximately 40 milliamps of current (minus any current the host device requires to remain powered), before the power supply may not be able to source additional current.

To ensure that the output power of the host device (i.e., the amount of power being drawn by the modular devices) is maintained below a maximum power output threshold, i.e., a power limit, the output power of the host device may be measured via a sense circuit 406. The sense circuit 406 may measure the current and/or voltage of the $V_{CC}$ rail. The sense circuit 406 may be in communication with the control circuit 414. For example, the control circuit 414 may receive the current and voltage measurements sensed by the sense circuit 406, and use the received measurements to calculate the output power of the host device.

When the output power approaches, meets, or exceeds the power limit, the control circuit may enter an error mode. In the error mode, the host device 404 may turn off the power supply to $V_{CC}$ via a control line 440. The control circuit may further provide feedback to a user that the power limit has been approached, met, or exceeded. For example, the feedback may include blinking one or more of the LEDs 418, controlling the load 405 to blink, etc. Although the power supply to $V_{CC}$ has been turned off, the control circuitry of the host device may remain powered via a separate power rail, or $V_{CC}$ may be turned off downstream after powering the control circuitry. That is, the host device may remain powered even after $V_{CC}$ to the modular devices has been removed.

The power output of the host device may be specified in power draw units (PDUs). Downstream modular devices which sink power from the host device low voltage power source may be specified as consuming a certain number of PDUs. Defining a number of PDUs consumed by a modular device may allow a user to easily determine whether a host device may be capable of providing sufficient power to the desired modular device. For example, a host device may supply five PDUs. If a user desires to power multiple modular devices such as an occupancy sensor modular device (one PDU), a speaker modular device (three PDUs), and an RF modular device (two PDUs), the user may quickly be able to determine that a total of six PDUs are required to power the modular devices, but the host device may only supply five PDUs. Therefore, one or more additional host devices may be necessary to supply the required power to the modular devices; that is, multiple host devices may be on the same power supply bus 208. Host devices may be connected in parallel to source additional power by increasing the available current. For example, the low voltage power and ground connections may be electrically connected between the one or more host devices. Each host device may monitor the output voltage and/or current provided to the respective power contact via the sense circuit 406 shown in FIG. 4 to ensure the output power is below the maximum threshold.

Additionally, the host devices may communicate with each other, either via a communication line or through wireless communication (such as radiofrequency (RF) communication, such as Bluetooth, ZigBee, Thread, etc.) to intelligently adapt their voltage output such that each host device outputs the same voltage. For example, the host devices may communicate via one or more of: the communication circuit 424; a wired communication bus which may include at least one contact on the power terminal 412; or the power and ground wires of the power terminal 412.

Alternatively, or additionally, upon system power-up, a modular device may communicate with a host device to determine whether sufficient power is available to fully power the modular device. The host device and modular device may communicate via a wired connection, for example, one or more additional contact terminals (not shown) on the power terminal 412, and connected to a communication contact on the power terminal of the modular device. Alternatively, the host device and modular device(s) may communicate via wireless communication. For example, the modular device may startup in a low power mode, that is, the modular device may only turn on the minimum number of processes needed to communicate with the host device, and may not power any auxiliary circuitry associated with the functions of the modular device.

For example, a voice assistant modular device may include a microphone. The voice assistant modular device may receive audio signals from the microphone and may process the signals locally via an audio processor, and/or the voice assistant modular device may transmit the audio signals to a remote server for additional voice processing. Processing the audio signals either locally and/or transmitting them remotely may require a higher amount of power than when the voice assistant modular device is not transmitting or processing audio signals. As described, the modular device may initially startup in a low power mode to communicate with the host device. For example, a voice assistant modular device which starts up in the low power mode may communicate with the host device, but may not provide power to the microphone circuitry.

During the low power mode, the modular device may communicate with the host device to request a number of PDUs from the host device(s). The requested number of PDUs may be the number of PDUs that are available from the host device or may be the number of PDUs necessary to power the modular device. The modular devices may not draw additional power from the host device unless sufficient power is available. That is, the modular devices may not power auxiliary circuitry, such as the microphone circuitry for the voice assistant modular device, until the host device determines that a sufficient number of PDUs are available.

If the host device determines it has an insufficient number of PDUs to power the modular device, the host device (or the modular device) may blink an error code to alert a user that there is not enough power available for the host device to power the modular device. For example, the host device and/or the modular device may blink one or more LEDs. Alternatively, or additionally, the host device or modular device may send a command via a communication circuit (such as communication circuit 424 shown in FIG. 4) which may send a push notification to a user's cellular phone or mobile device.

Figure 5:
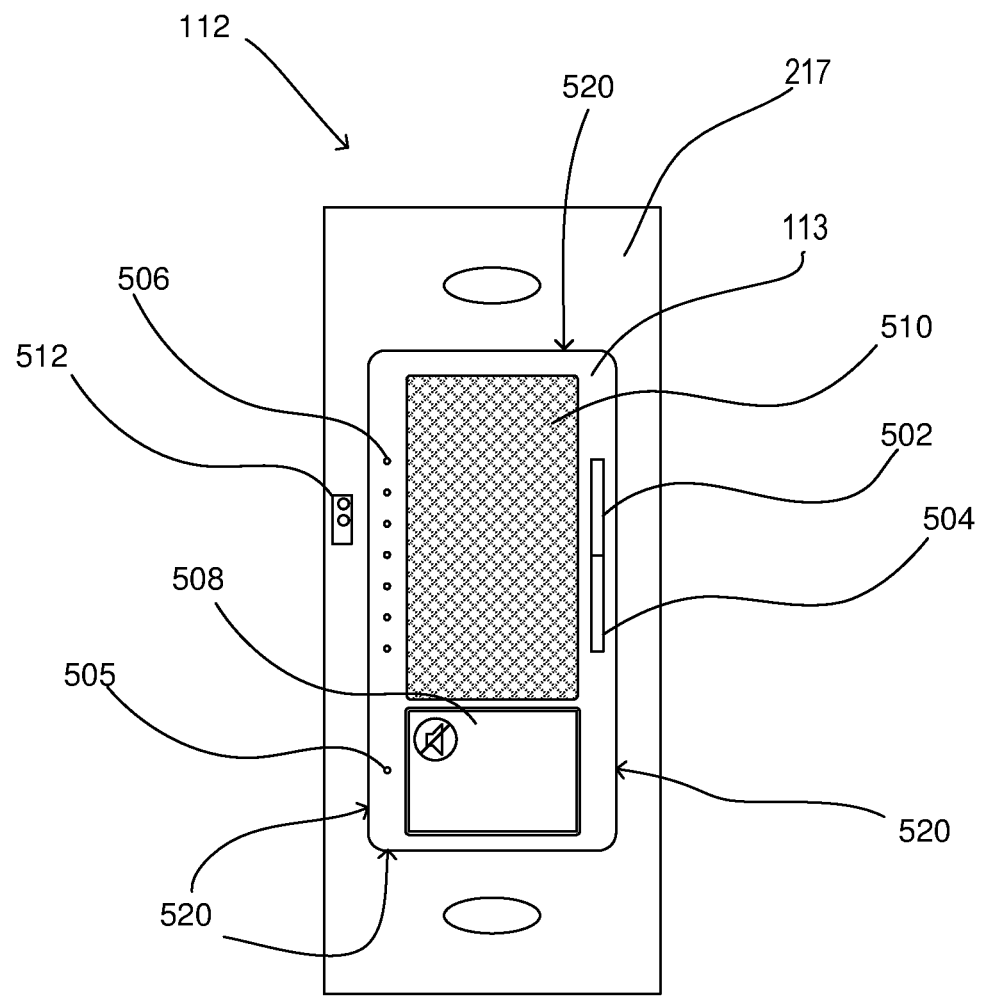
FIG. 5 is a front view of the example modular device shown in FIG. 1.

FIG. 5 is an example modular device 112, such as the modular device 112 shown in FIGS. 1-2. The modular device may have a surface 113 which contains a user interface. The modular device 112 may be a voice assistant modular device. The voice assistant modular device may contain one or more microphones and one or more speakers located behind a protective cover 510. The protective cover may be a mesh, grille, slats, pinholes, or other type of protective cover for acoustic transducers. A user may verbally make a request to the voice assistant modular device 112. The modular device 112 may receive the verbal request via the one or more microphones, and may process the request. For example, the modular device 112 may process the request locally via an audio processing chip, and/or the modular device 112 may transmit the audio data to one or more remote servers for voice processing. The modular device 112 may then transmit a response to the user's verbal request via the one or more speakers behind protective cover 510. For example, a user may request the current weather. The modular device 112 may receive and process the request, and may respond with the current weather. In another example, a user may request the voice assistant to play music. The modular device 112 may receive the request and begin playing music via the speakers.

The speaker volume may be adjustable. For example, the modular device may contain an array of LEDs 506 adjacent to the protective cover 510 to indicate volume. A user may press the rocker buttons 502 and 504 to increase or decrease the volume, accordingly. For example, the user may press the rocker button 502 multiple times, or may press and hold the rocker button 502, to increase the speaker volume. The user may similarly press the rocker button 504 to decrease the volume. The increase or decrease in speaker volume may be indicated by the LED array 506. For example, the LED array 506 may temporarily turn on (i.e., become active) to indicate the volume level.

The voice assistant modular device may further contain a button 508. The button may be a mute button. For example, when a user actuates button 508, the speaker may be inoperable. The LED 505 may turn on to indicate that the modular device is muted. Alternatively, the voice assistant modular device may be configured as an intercom, wherein a user may actuate button 508 to transmit voice commands to an external device.

The voice assistant modular device may further contain a power terminal 512 that may contain a power contact and a ground contact. The power terminal 512 may be configured the same as the power terminal 312 located on host device 104 and described previously. For example, the power terminal may be located on an area of the modular device that is accessible when a faceplate is not installed over the modular device, but not located on the surface 113 containing the user interface. For example, the power terminal 512 may be located on a front surface of the yoke 217, as shown. Or, the power terminal 512 may be located on a side surface 520 of the surface 113 that protrudes from the yoke 217, similar to the host device. (In this case the mating terminal on the faceplate may have one or more contacts that protrude from the mating terminal into the opening of the faceplate to be able to mate with the power terminal 512 on the side surface). However, one skilled in the art will readily recognize that the power terminal 512 need not be exactly the same as the power terminal 312 of the host device, but each could be a different variation of the power terminal contacts described previously. The modular device 112 may receive power from the power connection 312 of the host device through the power supply bus 208 and to the power terminal 512 of the modular device.

Figure 6:
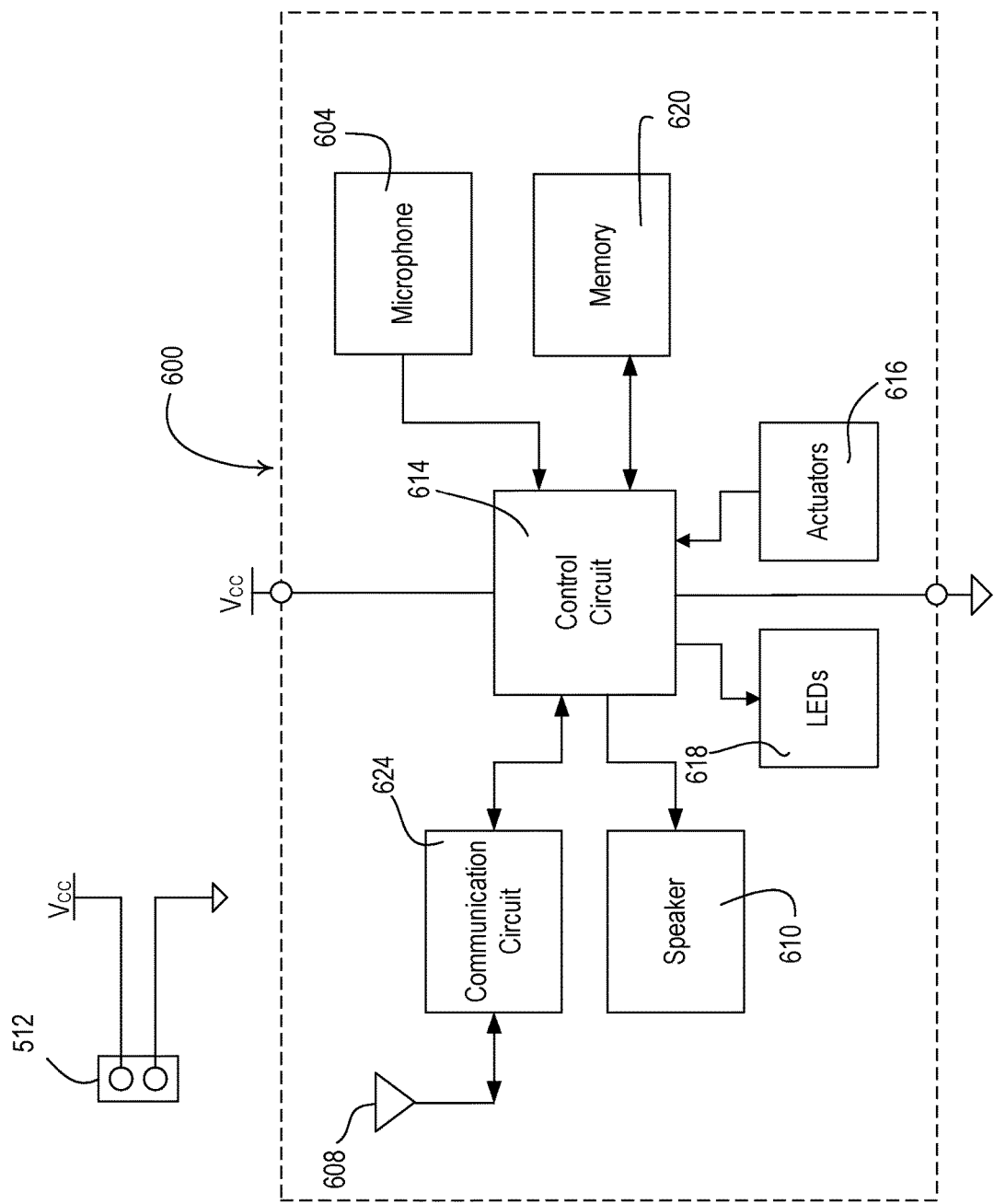
FIG. 6 is a simplified block diagram of the example modular device of FIG. 5.

FIG. 6 is a block diagram of an example voice assistant modular device 600, which may be the modular device 112 of FIGS. 1-3 and FIG. 5. The example modular device described may be used as a voice assistant, room-to-room intercom, or other audio device.

The modular device 600 may include a control circuit 614. The control circuit 614 may include one or more of a processor(s) (e.g., a microprocessor(s)), a microcontroller, a programmable logic device (PLD), a field programmable gate array (FPGA), an application specific integrated circuit (ASIC), or any suitable controller or processing device.

The modular device 600 may include a communication circuit 624. The communication circuit may be a wireless communication circuit, although one will understand the communication may additionally or alternatively be wired. The communication circuit 624 may include a RF transceiver coupled to an antenna 608 for transmitting and/or receiving RF signals. The control circuit 614 may be coupled to the communication circuit 624 for transmitting and/or receiving digital messages via the RF signals. The control circuit 614 may be configured to transmit RF signals while an actuator 616 (similar to actuator 508 of FIG. 5) is being actuated or after receiving a specific voice command from the microphone 604. Alternatively or in addition to an RF transceiver, the communication circuit 624 may be an infrared (IR) transmitter and/or receiver for transmitting and/or receiving IR signals.

The modular device 600 may include a memory 620. The memory 620 may be communicatively coupled to the control circuit 614 for the storage and/or retrieval of, for example, operational settings, such as, voice command wake words, for example. The memory 620 may be implemented as an external integrated circuit (IC) or as an internal circuit of the control circuit 614. The memory 620 may hold software to control the function of the modular device 600.

The modular device 600 may contain one or more input circuit/input devices, such as a microphone 604 for monitoring acoustic data in a space. The modular device may also have a speaker 610 for transmitting audio in the space. For example, the microphone may receive sound from the space, including a verbal request by a user. The control circuit 614 may receive the sound as acoustic data from the microphone and may either process the data locally, or transmit the acoustic data via the communication circuit 624 and the antenna 608 to a remote server for further processing. For example, the acoustic data may be transmitted to a remote server located on the Internet. The remote server may process the acoustic data and send a response back to the voice assistant modular device 600. The control circuit may receive the response and may acoustically transmit the response to a user via the speaker 610. For example, a user may make a request to the voice assistant, for example, asking what the weather is like. The voice assistant may respond to the request as described to reply with the current weather.

The modular device 600 may also receive inputs from one or more actuators 616. For example, the actuators 616 may correspond to volume buttons 502, 504 of FIG. 5. In response to the actuations, the control circuit may adjust a volume (i.e., an amplitude of a signal) provided to the speaker 610. The control circuit 614 may further control one or more LEDs 618 (corresponding to LED array 506 of FIG. 5), to illuminate visual indicator LEDs to provide feedback to the user on the current volume of the voice assistant modular device 600.

The modular device may receive power from a host device via a power terminal 512 having at least a power contact connected to a $V_{CC}$ power rail and a ground contact connected to a ground rail. The $V_{CC}$ power rail may supply power to the control circuit 614 and other low-voltage circuitry, such as a speaker 610, microphone, communication circuit, and one or more LEDs 618 (corresponding to the LED array 506 of FIG. 5).

Other types of modular devices may have similar block diagrams to the modular device 600 shown in FIG. 6. For example, other modular devices may all have the power terminal 512 and receive power from a host device. Additionally, other modular devices may include different inputs (i.e., input circuits) and/or outputs. For example, an occupancy sensor modular device may include a sense circuit as an input circuit instead of a microphone as an input circuit. The sense circuit may sense or detect occupancy, that is, whether one or more people are in a room, using any one of a passive infrared, ultrasonic, microwave, or microphonic detection technology. Further, for example, the occupancy sensor modular device may not include a speaker as shown in the voice assistant modular device 600.

Figure 7:
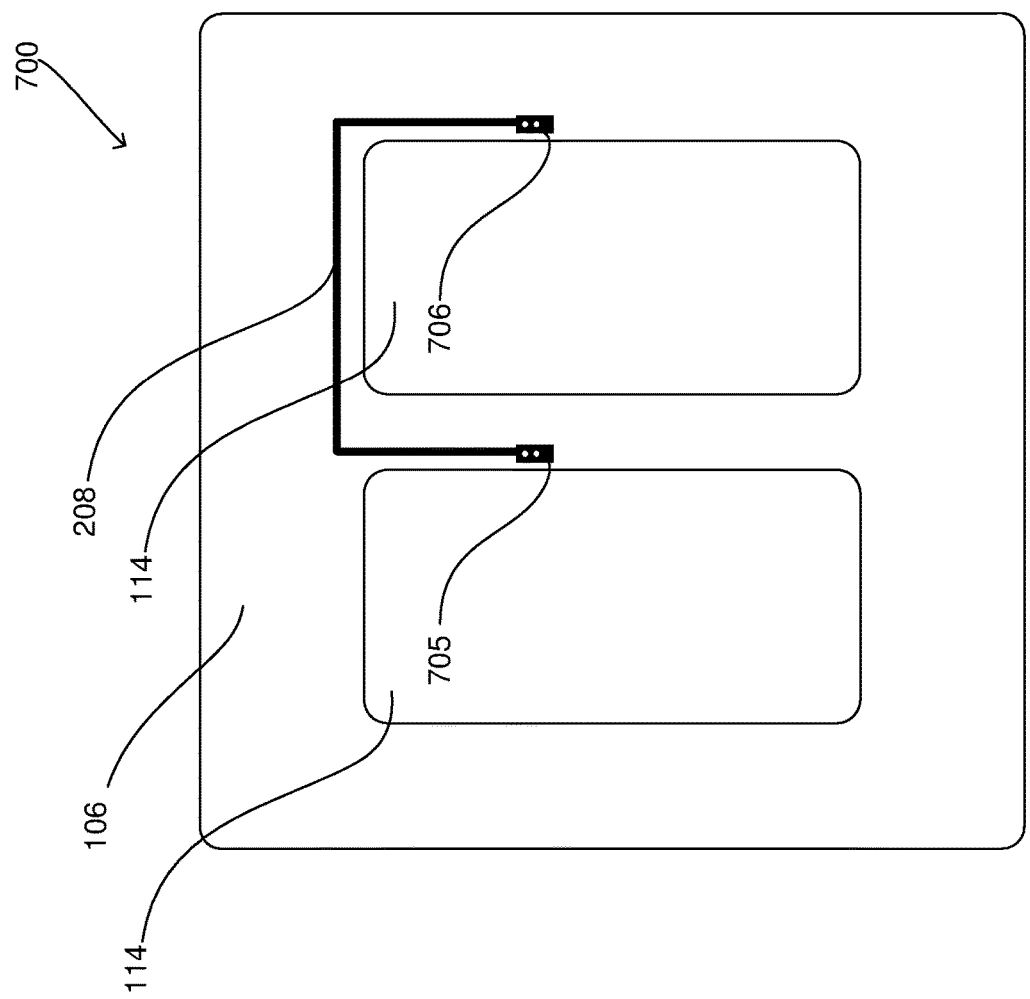
FIG. 7 is a rear view of the faceplate from the multi-gang wall installation of FIG. 1 showing the faceplate wiring connections between the devices.

FIG. 7 is a rear view of faceplate 104 of FIG. 1, showing the rear side of the faceplate, which includes the power bus assembly 700 which includes the faceplate assembly 106, the power bus 208, and mating terminals 705, 706. According to any of the embodiments discussed herein, one skilled in the art will recognize that the faceplate assembly 708 may include multiple pieces, such as a faceplate-adapter assembly. For example, the faceplate assembly may include the faceplate 106 of FIGS. 1 and 2 (which show a front view of the faceplate), and an adapter, where the adapter is screwed or mounted to the wall and the faceplate is snapped or adhered to the adapter. For example, the adapter may hold the power supply bus 208, that is, the power supply bus 208 may be integrated with the faceplate or the adapter. Further, the embodiments described below may be used alone or in any combination together.

The faceplate 106 may include two or more openings 114, as shown in FIGS. 1 and 2, through which a surface 105 of the host device 104 and a surface 113 of a modular device 112 may protrude to be accessible to a user. The faceplate may also include the power supply bus 208 with mating power terminals 705, 706. The mating power terminals 705, 706 may be power terminals with the same types of contacts, or they may have different types of contacts, as previously described. The power supply bus 208 may be integral with the faceplate assembly 700, that is, attached or adhered to the faceplate, or it may be separate. The modular device and the host device may each include a power terminal 312, 512 as shown in FIGS. 3, 5, which interfaces with the power supply bus 208 via one or more contacts on the mating power terminals 705, 706. The contacts of the mating power terminal 705, 706 may electrically connect to the contacts of the power terminals 312, 512 of the host device 104 and the modular device 112 to transfer power from the host device to the modular device over the power supply bus 208.

As described previously, the power supply bus 208 may include at least two conductive paths between the installed devices which include a power connection/bus and a ground connection/bus. The ground connection/bus between the modular device and host device may be made through the yoke of the host device physically abutting the yoke of the modular device. The power connection/bus may be made through a conductive strip, wire, plate, etc., as shown. Alternatively, both the power and the ground connections may be run or routed in parallel and close proximity, for example, two wires, a two-wire cable, conductive strips, etc., as will be described in greater detail herein.

The faceplate 700 may be a standard faceplate, such as a decorator faceplate. For example, a standard faceplate may conform to one or more standard-size openings, which may be defined by one or more standards from the National Electrical Manufacturer's Association (NEMA) and/or the American National Standards Institute (ANSI) standards organization, for example, as defined in ANSI/NEMA WD 6-2002 Wiring Devices—Dimensional Specifications Standard, which defines a standard opening with a minimum length of 2.630 inches and a minimum width of 1.310 inches.

The power supply bus 208 may be standalone wires with mating contacts on the terminals 705, 706. For example, the power supply bus may contain a ground wire (ground bus) connected to a ground contact of the terminals 705, 706, and a power wire (power bus) connected to a power contact on the terminals 705, 706. The wires may be run separately, or the wires may be separately insulated but bundled together in a single sheath. The wires may be insulated small-gauge wire, for example, insulated flexible 22 AWG (American wire gauge) stranded wire. The power supply bus wire may connect the host device to the modular device and may be separate from the faceplate. For example, the power supply bus wire may be a wire bundle 208 with two contacts on each of terminals 705, 706, which a user may plug onto the respective mating terminals of the modular device and host devices. A user may then install the standard faceplate on top of the host device, modular device, and connecting power supply bus 208. That is, the faceplate 106 may act to cover the power supply bus wires when the faceplate is installed in the multi-gang wallplate assembly. Alternatively, the power supply terminals 705, 706 and bus wires 208 may be adhered to the standard faceplate 708 via an adhesive such as tape, glue, adhesive cable tie mounts with cable ties, etc., such that the act of placing the faceplate over the host and modular devices creates the connection between the power supply bus 208 and the respective power terminals on the host and modular devices.

In another embodiment, a standard faceplate may be used with a power supply bus 708 that is a rigid connection, such as a printed circuit board (PCB) with conductive traces to route power and ground. The mating terminals 705, 706 may be a male or female connector that is adhered to the PCB and electrically connected to the conductive traces. The mating terminal may be through-hole or surface mount soldered to the PCB. Alternatively, the mating terminal may be one or more conductive pads. The conductive pad(s) may be gold-coated using a standard PCB surface coating to prevent corrosion and oxidation of the contact. For example, the PCB may use an electroless nickel immersion gold (ENIG) coating, electroless nickel electroless palladium immersion gold (ENEPIG), or other suitable coating. The PCB may be adhered to a standard faceplate using adhesive cable tie mounts, double-sided tape such as 3M™ VHB 9469, glue, or other suitable adhesives, or it may be separate from the faceplate, that is, not attached to the faceplate. For example, the PCB may be snapped on to the power terminals of the host and modular device and covered by the faceplate.

Alternatively, the power supply bus may be a stamped or formed metal plate. For example, the ground connection between the host and modular devices may be through an electrical connection between a physical abutment the yokes of the respective devices as previously described, while the power bus may go through the stamped or formed metal plate of the power supply bus 208. The mating terminals 705, 706 may be a conductive pad as described, or may be a conductive finger, spring, pin, or other mechanical protrusion which electrically contacts the power terminal of the host and modular devices when the faceplate is installed. An example of a conductive spring that may be used for this purpose is described in more detail FIG. 9 of U.S. Pat. No.

9,609,719, issued Mar. 28, 2017, entitled "WIRELESS CONTROL DEVICE", which is incorporated by reference herein in its entirety.

Alternatively, the power supply bus may be a flexible connection, such as a flexible PCB or a conductive metal label. The flexible PCB or conductive metal label may contain or more conductive traces which connect between the power terminals 705, 706. The flexible power supply bus may be adhered to the faceplate using any of the means described previously.

In addition to the embodiments disclosed for use with a standard faceplate, any of these embodiments may be used with a faceplate 708 which may be specifically designed to support the power supply bus 208. For example, the faceplate 708 may include clips or snaps, one or more screws, or other mechanical fasteners which may secure the power supply bus 208 and the power supply terminals 705, 706 to the faceplate 708. That is, the power supply bus may be attached to the faceplate 708 via the mechanical fasteners.

In another embodiment, the power supply bus 208 may be integrated into the faceplate substrate. For example, the power supply bus may be an electrical path between the contacts of the power terminals 705, 706 which may be formed using a method such as electroplating, laser direct structuring, physical vapor deposition, etc. The mating terminals 705, 706 of the assembly 700 may be a contact pad, i.e., a conductive contact. Or, the mating terminal may be a male or female connector that is soldered or otherwise attached to the power supply bus via an electrical connection.

Although the power supply bus 208 is herein described as having a power and a ground connection between the host and modular devices, the power supply bus may also support additional connections which may provide additional functionality. The power supply bus may contain multiple power lines (and corresponding contacts) of different voltages, for example. Additionally, the power supply bus may not be limited to supplying power from the host to the modular device, but may additionally include one or several communication links. For example, the power supply bus may include a data line and/or a clock line. The host device and modular devices may receive the communication via the respective communication circuits and/or the control circuits of the host and modular devices. Alternatively, communication between the host and modular device may be established via the power bus and ground bus connections of the powers supply bus 208, using a protocol such as digital addressable lighting interface (DALI), ECOSYSTEM™, or a protocol as described in U.S. Patent Application No. 2013/0181630, published on Jul. 18, 2013, entitled, "DIGITAL LOAD CONTROL SYSTEM PROVIDING POWER AND COMMUNICATION VIA EXISTING POWER WIRING", or any other suitable known or proprietary protocol or communication standard.

Figure 8:
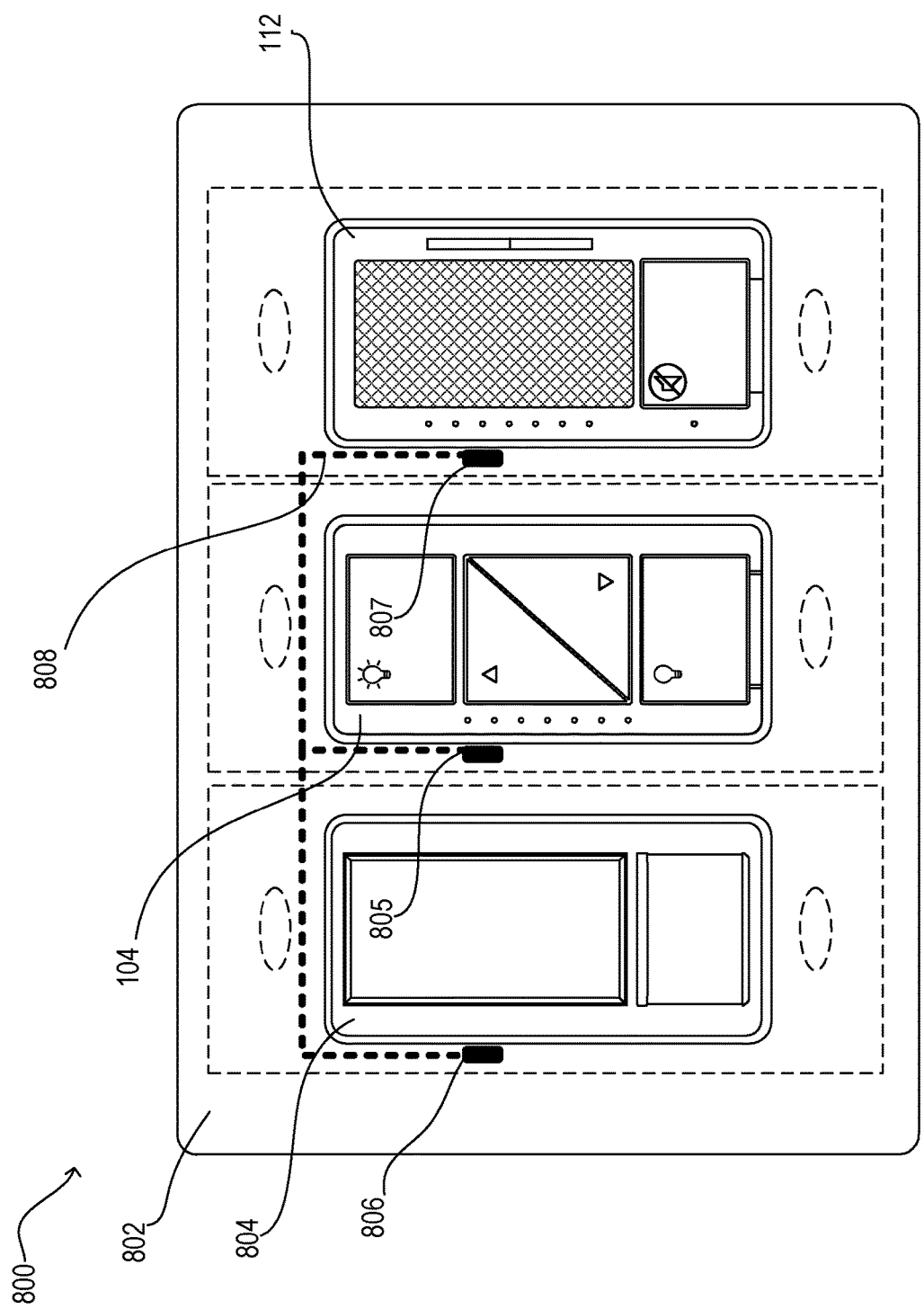
FIG. 8 is a transparent front view of another example multi-gang installation with wiring and mounting structures shown in dashed lines

FIG. 8 shows a wall installation 800 similar to the installation 100 shown in FIG. 2, with an additional modular device 804, and a faceplate 802 which may provide three openings, or gangs. For example, the wall installation 800 may be a multi-gang wall installation. The faceplate 802 may contain a power supply bus 808 with three terminals, 805 for connecting to the host device, and 806, 807 for connecting to each of the modular devices. The contact terminal 805 may be the same as contact terminals 806, 807, or they may be different contact terminals.

Although the configuration shown here depicts the host device 104 installed between two modular devices 112, 804, the devices may be installed in any configuration. For example, the host device may be installed on the left of the modular devices, or the host device may be installed on the right of the modular devices. Additionally, the multi-gang faceplate installation 800 need not be limited to one host device and two modular devices. The host device may be able to support multiple modular devices beyond the two shown here.

In addition to supporting multiple modular devices, the multi-gang wall installation may also support multiple host devices. The power supply bus may be configured to place the power output of the host devices in parallel electrical connection to provide the same voltage with a greater current sourcing capability. The use of multiple host devices may allow a user to increase the number of modular devices based on the number of PDUs available from the combined power of the multiple host devices. Multiple host devices may also allow a user to control additional electrical loads, wherein each host device may control a separate electrical load. For example, for lighting control host devices, a first host device may have a first dimmed hot connection to a first lighting load, and a second host device may have a second dimmed hot connection to a second lighting load. In this way, a user may control multiple electrical lighting loads from the same wall location. Alternatively, each host device may have its own power supply bus and may power a respective modular device.

As will be readily recognized by one skilled in the art, the multi-gang wall installation 800 may be scalable, such that after installing the host device, additional modular devices may be added adjacent to the installed host/load control device at a later time. This may provide the user with the benefit of configurability, allowing for future upgrades and changes without the need for wiring line voltage devices. For example, a load control host device may be installed in a single gang installation when a space is first built, for controlling respective electrical loads, and allowing for a user to later add a faceplate and additional modular devices to expand the capabilities of the space.

Figure 9A:
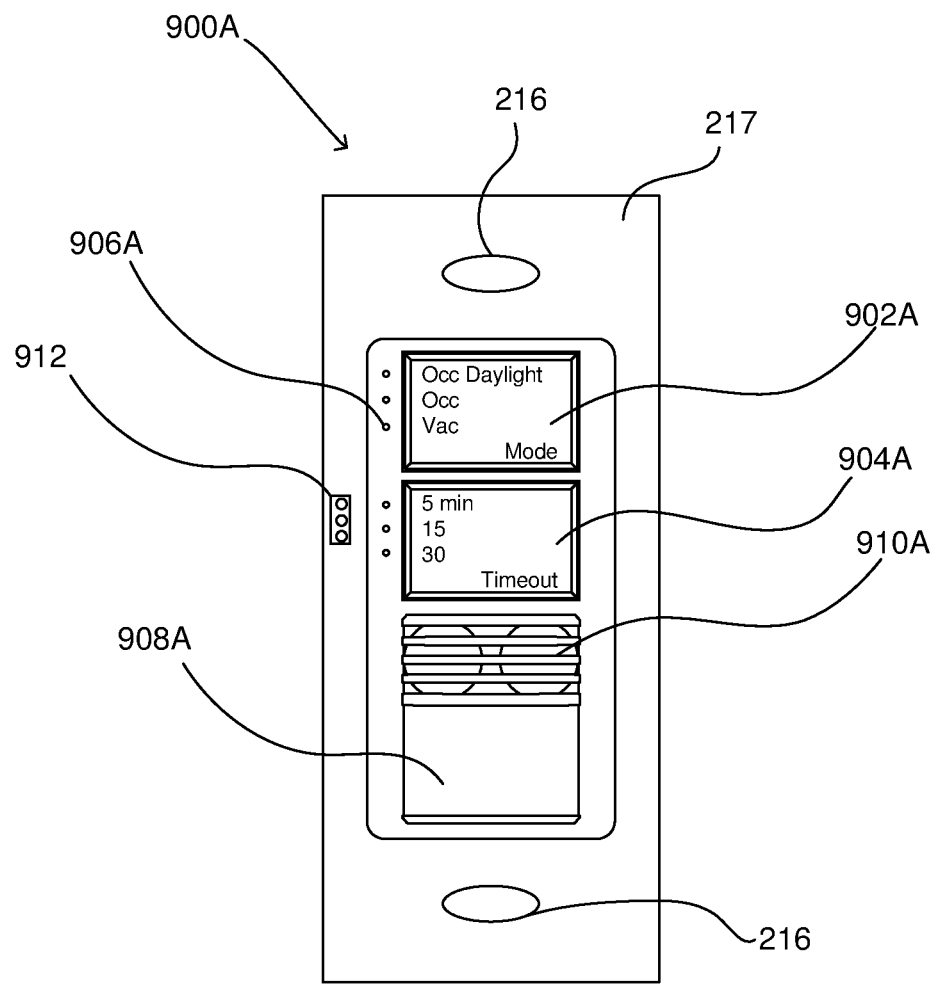
FIGS. 9A-9D are front views of example modular devices.

Additional example modular devices are shown in FIG. 9A-9D. The modular devices 900A-900D may be configured similar to the configuration shown in FIG. 4. FIG. 9A is an example occupancy or vacancy sensor modular device 900A. The occupancy or vacancy sensor modular device 900A may include one or more occupancy sensors, such as a passive infrared (PIR) sensor 908A, and ultrasonic transducers 910A. The sensor modular device may additionally or alternatively include other types of sensors, including, but not limited to: microwave, microphonic, daylight, etc.

The sensor modular device may have a communication circuit 424 to send information or control messages to other devices, for example, load control devices or a local load control (i.e., a host device that is a load control device on the same power supply bus as the sensor modular device. For example, the sensor modular device 900A may detect that a person has entered a space via one or more of the occupancy sensors, such as PIR sensor 908A and ultrasonic transducers 910A. Based on the detection, the control circuit may determine that the space is occupied, and may transmit (i.e., wirelessly transmit) an occupied command via the communication circuit 424 to a load control device or another device, such as a controller of a load control system. The load control device may control one or more connected electrical loads in response to the occupancy detection. For example, the load control device may be a lighting control device configured to control an electrical lighting load. In response to receiving the occupancy command from the sensor modular device, the load control device may turn on the lighting load. In another example, a controller of a load control system may receive the occupancy command from the sensor modular device and may transmit a load control command (e.g., a command to turn on a lighting load or turn on an HVAC system) to one or more respective load control devices. The sensor modular device (or any of modular device) may communicate with the host device and/or other modular devices via radio frequency (RF) communication, near-field communication (NFC), acoustic, visible light, infrared, lasers, inductive or capacitive coupling, or any other wireless communication means.

Alternatively, the sensor modular device 900A may communicate via a wired communication via power terminal 912. For example, the power terminal 912 may be similar to the power terminals previously discussed, such as power terminal 512 of FIG. 5. For example, the power terminal 912 may receive low voltage power from a host device. Additionally, the power terminal 912 is shown here as having three contacts, a power contact, a communication contact, and a third contact which may be a second communication contact or a ground contact. Here, the power supply bus 208 may include an additional bus to connect between the communication contacts of the power terminal 912. For example, the sensor modular device 900A may communicate with the host device via the power terminal 912 and the power supply bus (not shown). Where the host device is a load control device, the sensor modular device 900A may communicate occupancy information comprising occupancy or vacancy commands via the power contact 912 to one or more host devices connected to the power contact 912 via the power supply bus in order to control an electrical load. That is, the host device may receive the occupancy/vacancy command on the power supply bus from the sensor modular device and may subsequently control its respective electrical load in response to the occupancy/vacancy command.

The sensor modular device may contain one or more buttons 902A, 904A which may allow a user to program different sensor settings, such as sensor mode and sensor timeout, which will be described in more detail herein.

Button 902A may be a mode button with various mode selections for occupancy with daylighting (Occ Daylight), occupancy (Occ), and vacancy (Vac). The mode may determine how the sensor functions. In an Occ Daylight mode, the sensor modular device may communicate with a daylight sensor (not shown) to receive daylight measurements. The daylight sensor may be an external device, or the daylight sensor may be integrated with the occupancy sensor modular device. The occupancy sensor modular device may use the daylight measurements together with occupancy measurements from one or more of the occupancy sensors 908A, 910A to control the lights in a room based on occupancy and ambient light level. For example, in the Occ Daylight mode, the sensor modular device may send a message to the load control device to turn on the lights when the occupancy sensor detects occupancy in the room and when the daylight sensor detects the ambient light level is below a light threshold. Further, the sensor modular device may not send a message to the load control device when the occupancy sensor detects occupancy in the room and the daylight sensor detects an ambient light level above a light threshold. That is, the lights may only turn on in response to occupancy when the room is dark enough to require additional lighting (as determined by the light threshold). The light threshold may be a fixed threshold, or it may be adaptive based on user input or learned light levels. The adaptive adjustment of a light threshold are described in greater detail in U.S. Pat. No. 9,084,310, issued Jul. 14, 2015, entitled METHOD AND APPARATUS FOR ADJUSTING AN AMBIENT LIGHT THRESHOLD, herein incorporated by reference.

In the "Occ" mode, the sensor modular device 900A may send a message to one or more load control devices and/or a controller of a load control system when the occupancy sensor detects occupancy in the room. In the "Vac" mode, the sensor modular device may only send messages to the load control device to turn off the lights when the room is unoccupied, and may require a user to turn on the lights via a button actuation on a respective load control device or remote control device which controls an electrical load.

Button 904A may be a timeout button with various timeout selections for five ("5 min"), fifteen ("15"), and thirty ("30") minutes, for example. The timeout selection may determine the amount of time the load control system may wait after a room becomes unoccupied until the load control device turns off the lights. For example, when a user actuates the timeout button 904A, the "5 min" timeout may be activated, and the status LED to the left of the selection may turn on to indicate the selection has been activated. The sensor modular device may periodically send occupancy messages to the load control device during the time period when the room is occupied and the occupancy sensor detects occupancy in the room. When the room becomes unoccupied, the sensor modular device may stop sending occupancy messages, and after five minutes, the load control device may turn off the electrical load. The sensor modular device may send a command to the load control device to turn off the electrical load after the five minute timeout has expired. Alternatively, the sensor modular device may send the load control device the five minute timeout selection when the sensor modular device has been programmed, and the load control device may later determine when the timeout period has expired that the electrical load should be turned off. Although the timeouts described are for 5, 15, and 30 minutes, other timeout lengths could be used, such as 1 minute, 10 minutes, 1 hour, etc.

The selection options for each sensor setting may be displayed on the buttons 902A, 904A. For example, the selections may be printed, engraved, or engraved and backlit, embossed, etc. on the buttons 902A, 904A. Each selection may correspond to an adjacent visual status indicator 906A, to indicate which selection is active. For example, the LED next to "Occ" may turn on when the sensor modular device is operating in an "Occ" mode. Alternatively, the LED may turn on to show mode status only temporarily when the mode button is pressed, to conserve power.

A user may press button 902A or 904A to change the mode or time setting, respectively. For example, a user may press button 902 to change the mode of the sensor 900A. For example, the sensor 900A may be in the "Occ" mode. A user may press the mode button 902A to change the mode to the "Vac". The LED 906A corresponding the "Vac" mode may turn on to indicate to the user that the mode has been changed. Similarly, a user may press the timeout button 904A to change the timeout from a 5 minute to a 15 minute timeout, or may press the timeout button 904A twice to change from a five minute to a thirty minute timeout, etc. When the mode or timeout setting has reached the bottom setting (i.e., the "Vac" mode or the "30" minute timeout), the mode and timeout selections may cycle through to the first setting (i.e., the "Occ Daylight" and "5 min" settings).

Additionally, a user may be required to enter a programming mode in order to change one or more of the mode and timeout settings. For example, a user may press and hold the mode and/or timeout buttons for a certain period of time (e.g., 5 seconds) in order to enter a programming mode and be able to change the settings. The LEDs 906A may indicate whether the settings are able to be changed. For example, while in the programming mode, the LEDs may flash. In a normal mode, that is, while not in the programming mode, for example, the LEDs may be maintained in a solid "on" condition when the mode or timeout is not able to be changed (i.e., a user would need to press and hold the respective button for the appropriate length of time to enter a programming mode).

Figure 9B:
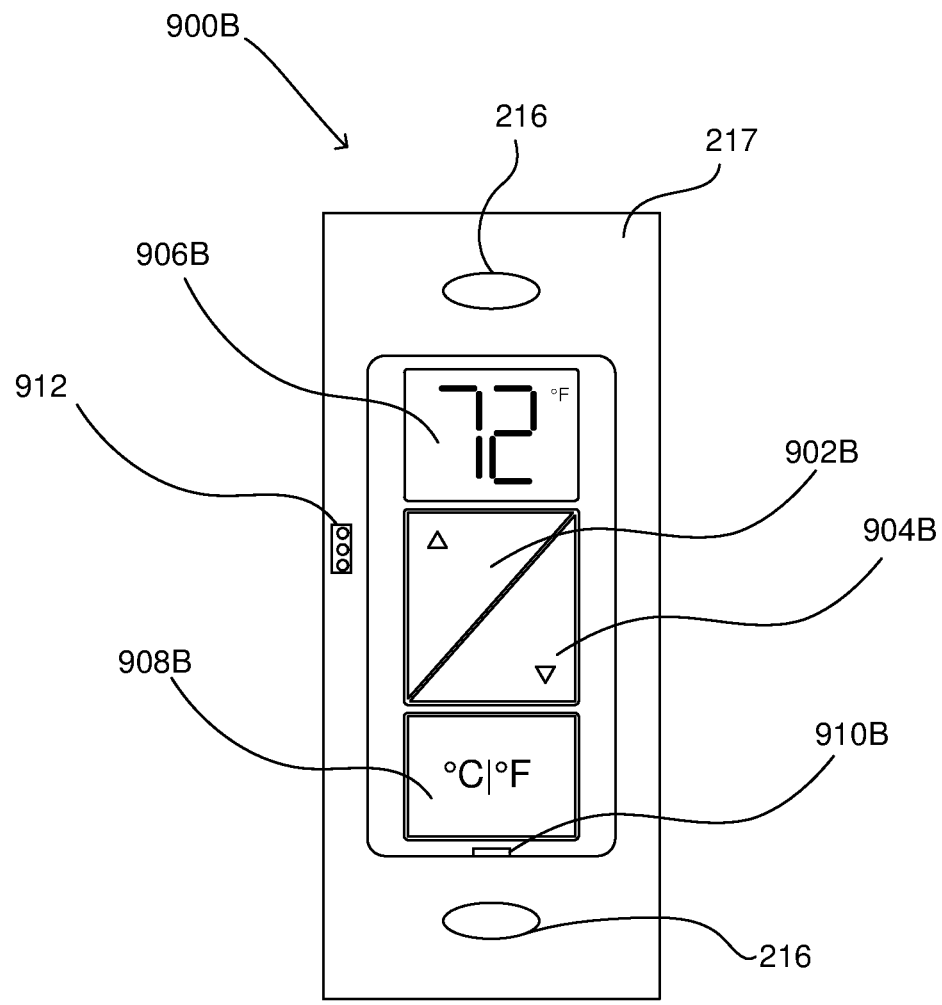

FIG. 9B is an example of a temperature control modular device 900B. The temperature control modular device 900B may have similar features as any of the modular devices previously described. The temperature control modular device may include an integrated temperature sensor (not shown) which may receive external airflow through an airflow vent 910B. The temperature control modular device may use the received airflow to across the temperature sensor to measure the air temperature of a room. The temperature control modular device may display the measured air temperature on a display screen 906B. The temperature shown on the display screen may be changed from degrees Celsius to degrees Fahrenheit by actuation of button 908B.

The temperature control modular device may also send commands to an HVAC system to control the temperature based on a set temperature. Buttons 902B, 904B may allow a user to increase or decrease the set temperature, respectively. The display screen may backlight or become active by showing a different background color and/or ink color to show the set temperature. For example, when the temperature control device measures a temperature of 74 degrees Fahrenheit, the display screen may display the room temperature 74° F. in black text with an unlit screen. However, a user may press button 902B or 904B to display the set temperature. For example, a user may then actuate button 904B, and the display screen may enter an active mode with a lighted screen and may display the set temperature 74° F., in green text. After the initial actuation, the user may further actuate button 904B a second or multiple times to decrease the set temperature by a desired amount. The temperature control modular device may send a command to the HVAC system to indicate the updated set temperature so that the HVAC system may begin to cool the room. Alternatively, the user may press button 902B to increase the set temperature and command the HVAC system to heat the room. The display screen may return to displaying the measured temperature in an inactive display mode after a timeout period has elapsed. Other indications of a measured vs. set temperature may include inverted display colors, a text or icon indication, or the like.

The temperature control modular device may further contain a power terminal 912, which may be the same as power terminal 912 shown in FIG. 9A. The temperature control modular device may communicate with a thermostat or HVAC system using a communication means as described previously for the occupancy sensor modular device. That is, the temperature control modular device may communicate wirelessly or via the contact 912 with a host device. The host device may then use the communicated data from the temperature control modular device to wirelessly transmit the data to a thermostat or HVAC system for adjusting the temperature of the space.

Figure 9C:
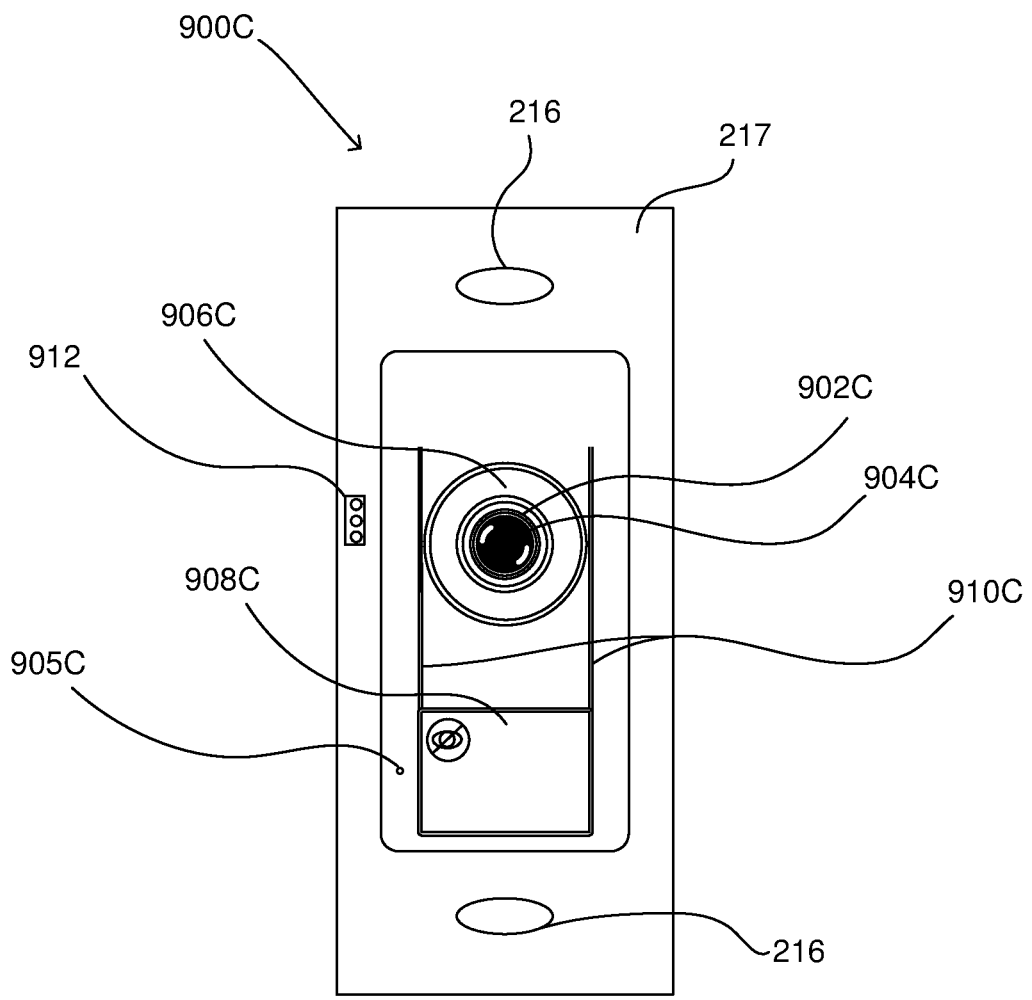

FIG. 9C is an example of a camera modular device 900C. The camera modular device may include a lens 904C for capturing an image of the space. The camera modular device may be used for security, video conferencing, web chats, etc. The camera modular device may also optionally include an optical zoom 906C and/or an aperture 902C.

The camera may be used as a stand-alone device or as a peripheral to another computing device, such as a personal computer, mobile device, etc. Alternatively, or additionally, the camera may be used as part of a smart home system.

The camera may also contain a privacy cover 908C to prevent the lens 904C from capturing an image of the space. For example, a user may slide the privacy cover along a track 910C to block the camera lens. The privacy cover may alternatively be a privacy button. For example, a user may press the privacy button to turn off the camera. The camera may also have one or more LEDs 905C. The LED 905C may turn on when the camera is recording images of the space. For example, when the camera is turned off, status LED 905C may turn off to indicate that the camera is off. For example, when a user presses the privacy button 908C, the camera may stop recording images of the space, and the LED 905C may further turn off LED 905C to indicate to a user that the camera is no longer recording images of the space.

The camera modular device may communicate with the load control system or a security system using a communication means as described previously for the occupancy sensor modular device, through either a control circuit or via the power terminal 912 to the host device.

In an alternative and/or additional embodiment, the camera modular device may be configured to perform integrated image processing. The integrated image processing may be used for various functions, such as occupancy detection, as described in U.S. application Ser. No. 15/374,928 entitled LOAD CONTROL SYSTEM HAVING A VISIBLE LIGHT SENSOR which is incorporated by reference in its entirety herein.

Figure 9D:
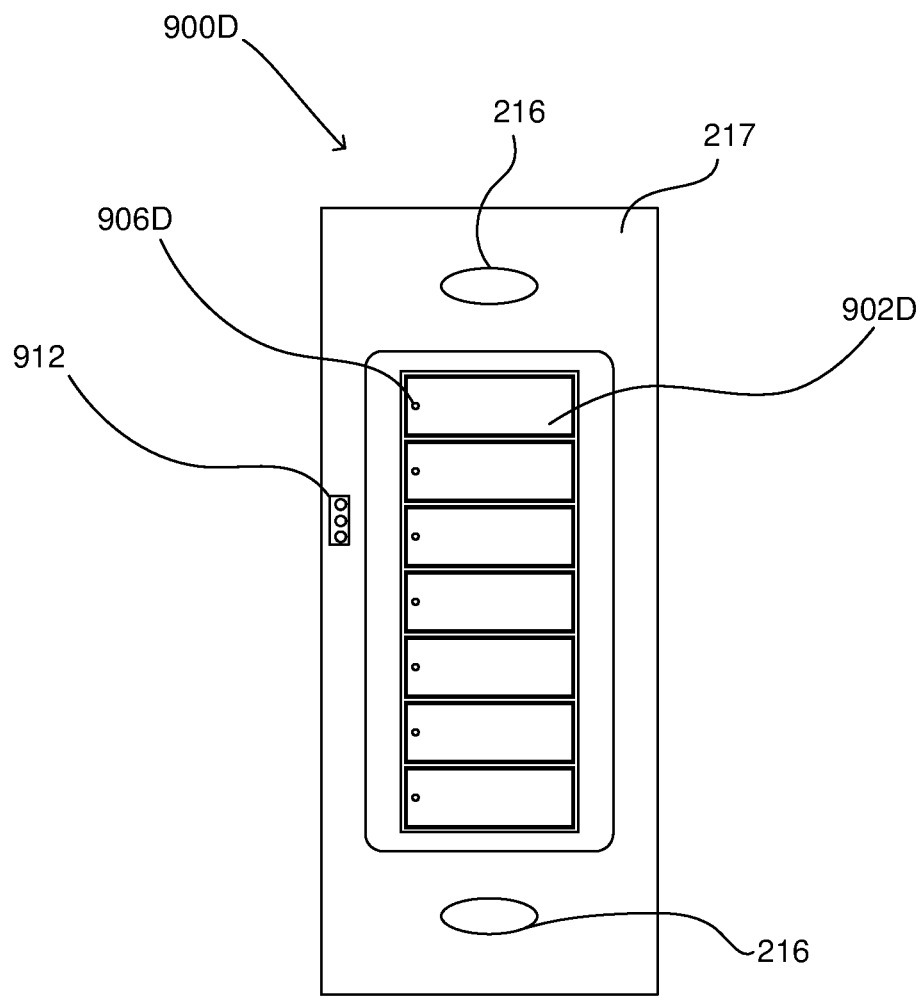

FIG. 9D is an example of a keypad modular device 900D. The keypad may have two or more buttons 902D, which may further contain text (not shown) or a status LED 906D. The buttons may be individual toggle actuators, or may be capacitive touch buttons. The status LED 906D may be located on the button, immediately adjacent to the button, or the LED may backlight the button or text on the button. The status LED for the corresponding to the button may turn on to indicate which button is active.

Each button 902D may have a corresponding scene or action associated with the button. A user may press a button 902D on the keypad 900D to activate the scene corresponding with that button. In response to the button actuation, the keypad 900D may transmit a message to other load control devices, or to a controller which may transmit the message to other load control devices, to control one or more electrical loads based on the transmitted message. For example, a scene may be a lighting scene. In response to a user pressing a scene button 902D on the keypad 900D, the keypad may transmit one or more messages, either wirelessly or via the power supply bus 208 to the host device. In response to the messages, one or more lighting control devices may control one or more respective lighting loads according to the specified scene. A scene may be pre-configured at the time of setup of the lighting control system. For example, a "goodnight" scene may instruct one or more lighting control devices to turn off their respective lighting loads. A "reading" scene may instruct a lighting control device to turn on a tableside or bedside lamp and instruct a second lighting control device to turn off the overhead lights. The keypad modular device may communicate with the load control system using a communication means as described previously for the occupancy sensor modular device. Additional examples of scenes in a lighting control system may be found in greater detail in U.S. Patent Application Publication No. 20150185752, published Jul. 2, 2015, entitled "Wireless Load Control System", which is incorporated by reference in its entirety herein.

The keypad modular device may further contain a power terminal 912, which may be used for power and/or communication with one or more host devices, as previously described.

In addition to all of the modular devices shown herein, one will recognize that any number of additional types of modular devices may be powered by a host device, or may provide power as a host device. For example, a modular device may be a solar cell which stores energy to power the host and/or other modular devices. Additional modular devices may include, for example, a battery backup modular device. The battery backup modular device may include batteries, such as coin cell batteries, for providing power to the power supply bus via the power terminal of the battery backup modular device when the host device loses power or is unable to provide power to the modular devices. For example, when the power bus voltage drops below a threshold level, the battery backup modular device may begin supplying power on the power bus 208 via a power terminal to power one or more modular devices. Additionally or alternatively, the battery backup modular device may include a rechargeable battery or battery pack which may be charged by a host device, a solar cell, a wireless power supply, etc., and be used to provide power when the host device power drops below a minimum threshold.

In another example, the modular device may be a remote control device, such as a remote load control device or a remote audio control device. The remote control modular device modular device may have one or more actuators for receiving a user input. When a user presses one of the actuators on the remote control modular device, the remote control modular device may transmit a communication which may cause a load control device to control an electrical load (e.g., a lighting load, a speaker, etc.). For example, the remote control modular device may transmit the communication wirelessly, or through a wired communication to the host device (i.e., via the power supply bus 208), which may then re-transmit a wired or wireless communication to the load control device or another intermediate device to control the electrical load.

Additionally, a host device may be used to power any type of modular device, including, but not limited to: occupancy or vacancy sensor, microphone and speaker, temperature sensor, temperature control, heating unit, air freshener, carbon monoxide detector, smoke detector, daylight sensor, humidity sensor, beacon, RF modular device for upgrading non-RF devices, keypad or wired remote, clock, nightlight, security keypad, fingerprint scanner, retina scanner, camera, IR receiver and transmitter, USB charging port, card reader, near field communication (NFC) device, radio frequency identification (RFID) reader, remote control device, etc.

The modular devices may also be installed in a stacked manner, i.e., two or more modular devices may occupy the space of a single decorator opening in the faceplate. For example, a modular device may have a user interface that is half the height of the user interface shown, and therefore, two modular devices may fit inside a single opening 114 of the faceplate 106 of FIG. 1. Accordingly, the faceplate may include two or more power terminals per each opening 116 to support powering either a single modular device in the opening or two stacked modular devices in the opening. This may allow the user to install smaller devices in a faceplate that takes up less wall space. One will understand that host devices may be modified similarly, such that a single host device may fit in the same opening 114 as one or more modular devices or other host devices.

Additionally, although the modular devices have been described as being mounted either through attachment to an electrical wallbox or to the wall via the mounting holes 216, alternatively, the modular devices may be easily removeable by the user without the need to remove the faceplate. That is, the modular devices may not include a yoke 217, which pins the modular device behind the faceplate. That is, the faceplate may not have one or more openings, but rather may contain one or more depressions or cups for holding the modular device(s). For example, the modular devices may magnetically snap in to an adapter plate, or they may have a mechanical arm that pops the modular device out from the plate upon actuation. Easy removal of the modular devices may allow a user to change out which modular devices are installed and easily change the functionality of a room. In this embodiment, the power terminal may be located on a side of the modular device, such as side 520, or on the back of the modular device (not shown).

Any of the circuit elements contained within each modular device may also be plugged into or integrated with the faceplate. In a first example, the faceplate may have one or more solar cells which may be used to as a power source if the host devices loses power. For example, the solar cell(s) may provide supplementary power to the power supply bus. In another example, the faceplate may have a female USB connector on a bottom or top edge to plug in a sensor via the USB connection, and may further contain other circuitry components, such as a control circuit, communication circuit, etc. Alternatively, the sensor (or any other modular device components) may be integrated into the faceplate. A faceplate with integrated circuit elements may be referred to herein as a "smart faceplate". FIG. 10A is a front view of an example of a smart faceplate 1000A with integrated occupancy sensing. The smart faceplate may include one or more openings 1004 for receiving at least one host device and one or more additional host devices, modular devices, or other standard wallbox controls.

The smart faceplate 1000A may include an integrated occupancy sensor 1008, shown as a PIR occupancy sensor. The occupancy sensor may be attached to a PCB or flex PCB (not shown), which may be integrated within the faceplate 1000A and which may derive power from the host device via a power supply bus using any of the wiring or attachment mechanisms described previously. In this way, the circuitry which may have been used in an additional modular device, using another opening 1004 in the faceplate may now reduce the size of the faceplate 1000A by integrating the circuitry from the modular device into the smart faceplate.

The smart faceplate may further include an RF circuit to wirelessly communicate with devices in a load control system. Or, the occupancy circuit may be wired directly via an additional signal/communication wire of power supply bus 208, or use the low voltage power wiring for communication, to a load control host device to allow the host device to control a load based on the occupancy signal. For example, when the occupancy sensor senses motion within the room in which the smart faceplate is installed, the occupancy sensor may send an occupancy signal either via the low voltage wiring, or via RF, to the load control host device. The load control host device may receive the occupancy signal, and in response to the occupancy signal, turn on the electrical load which it controls.

In addition to the modular device functionality described previously, such as daylight sensors, lights or nightlights, temperature sensors, speakers, microphones, etc., additional functionality could also be added to the smart faceplate beyond what the modular devices may be capable of. For example, the smart faceplate may be a single gang faceplate used with a host device that is a load control device, whereby the smart faceplate provides keypad (i.e., scene selection) functionality to the host/load control device, where the keypad is powered by the host device and may communicate with host device (via the bus 208 or RF, etc.). The keypad functionality may be accessible via a touch input by the user on the front or side face of the faceplate, using resistive or capacitive touch technology. In this example, a user may interact with the side of the faceplate by tapping or pressing a different area on the side or front of the faceplate to activate certain scenes.

Figure 10B:
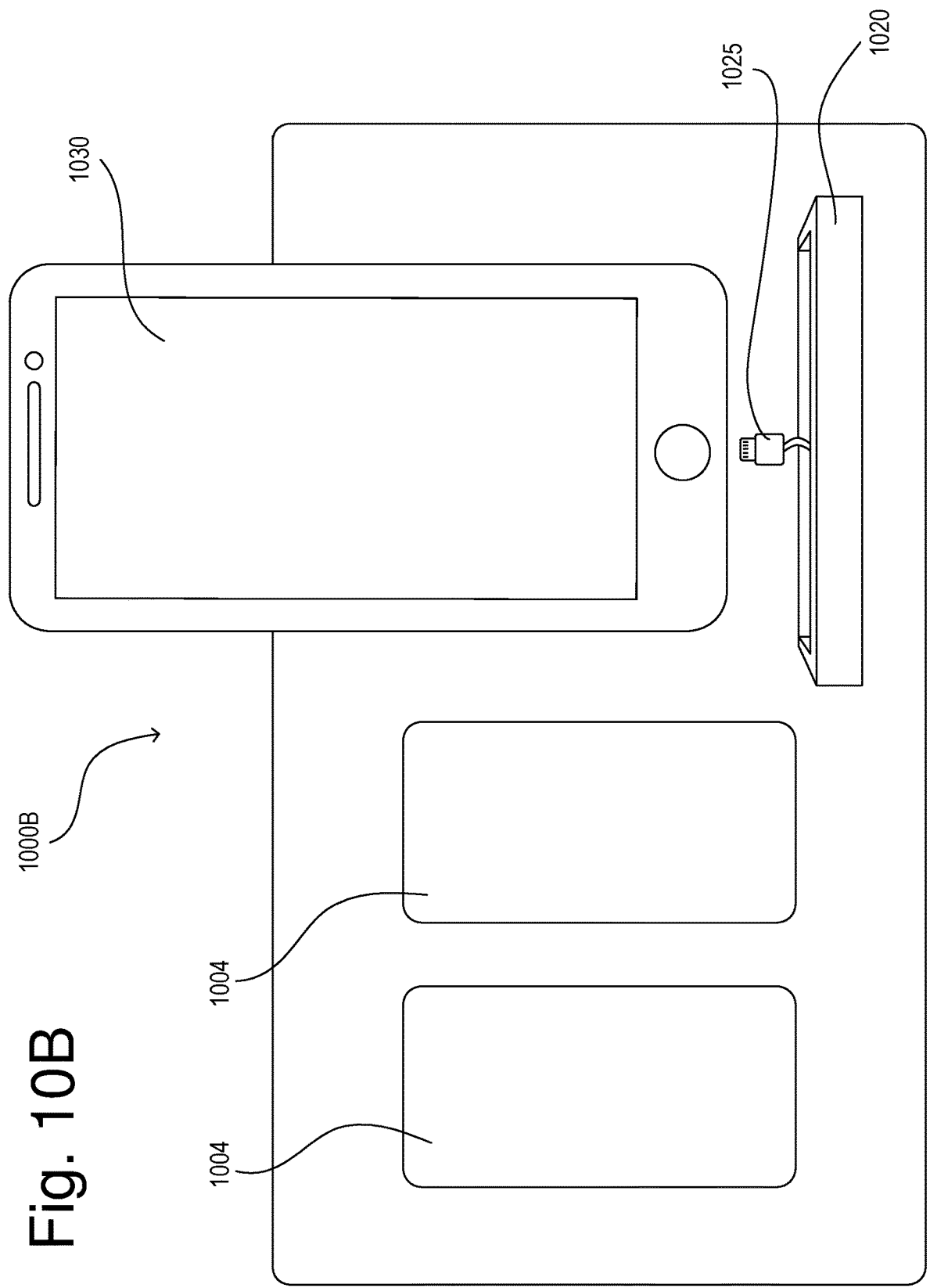

FIGS. 10B and 10C are example embodiments of another smart faceplate 1000B. Similar to faceplate 1000A of FIG. 10A, the smart faceplate 1000B may include one or more openings 1004 for receiving at least one host device and one or more modular devices, or other standard wallbox controls.

The faceplate 1000B may further include a charging device/dock 1020 for charging a wireless device, such as a mobile phone 1030. The charging device 1020 may provide power to charge the wireless device via power derived from the host device using the power supply bus 1045, according to any of the previously described mechanisms. The charging device 1020 may be a charging dock, for example. The charging dock may have a slot or ledge 1022 on which the wireless device (i.e., mobile phone 1030) may rest while the wireless device receives power from the smart faceplate to recharge the wireless device.

The charging device/dock 1020 may have a plug 1025, which may be configured to plug into a charging port (not shown) of the mobile phone 1030 for providing power to the mobile phone 1030. For example, the charging plug 1025 may be a lightning connector, a mini- or micro-Universal Serial Bus (USB) connector, or the like. One of the terminals 1040 may connect to a host device installed in one of the openings 1004 to supply power via a power supply bus 1045 to a power converter 1050. The power converter 1050 may convert the low voltage power to the appropriate voltage and/or current for charging the mobile device via the plug 1025 (assuming the bus 1045 is not at the correct voltage).

Alternatively and/or additionally, the charging device/dock 1020 may be a wireless charging dock. The mobile phone 1030 may wirelessly connect to the charging device/dock 1020 to recharge the mobile phone. For example, the charging device/dock 1020 may include an inductive coil 1060 behind a front surface of the faceplate 1000B which inductively couples to a charging antenna inside the mobile phone 1030 to wirelessly charge the mobile phone 1030. For example, one of the terminals 1040 may connect to a host device installed in one of the openings 1004 to supply power via the power supply bus 1045 to a power converter 1052. The power converter 1052 may convert the low voltage direct current power to an alternating current (AC) power of appropriate voltage and provide the AC power to the inductive coil 1060. The inductive coil 1060 may couple to the mobile device 1030 to wirelessly provide power to the mobile device 1030.

Although the wireless device is shown here as mobile device 1030, one will understand that other rechargeable battery-powered devices may be recharged from the charging device/dock 1020 of the faceplate 1000B. For example, other devices such as wireless earbuds or headsets, battery-powered wearable devices, etc., may also be recharged via the charging device/dock 1020 and may rest on the ledge 1022.

Figure 11:
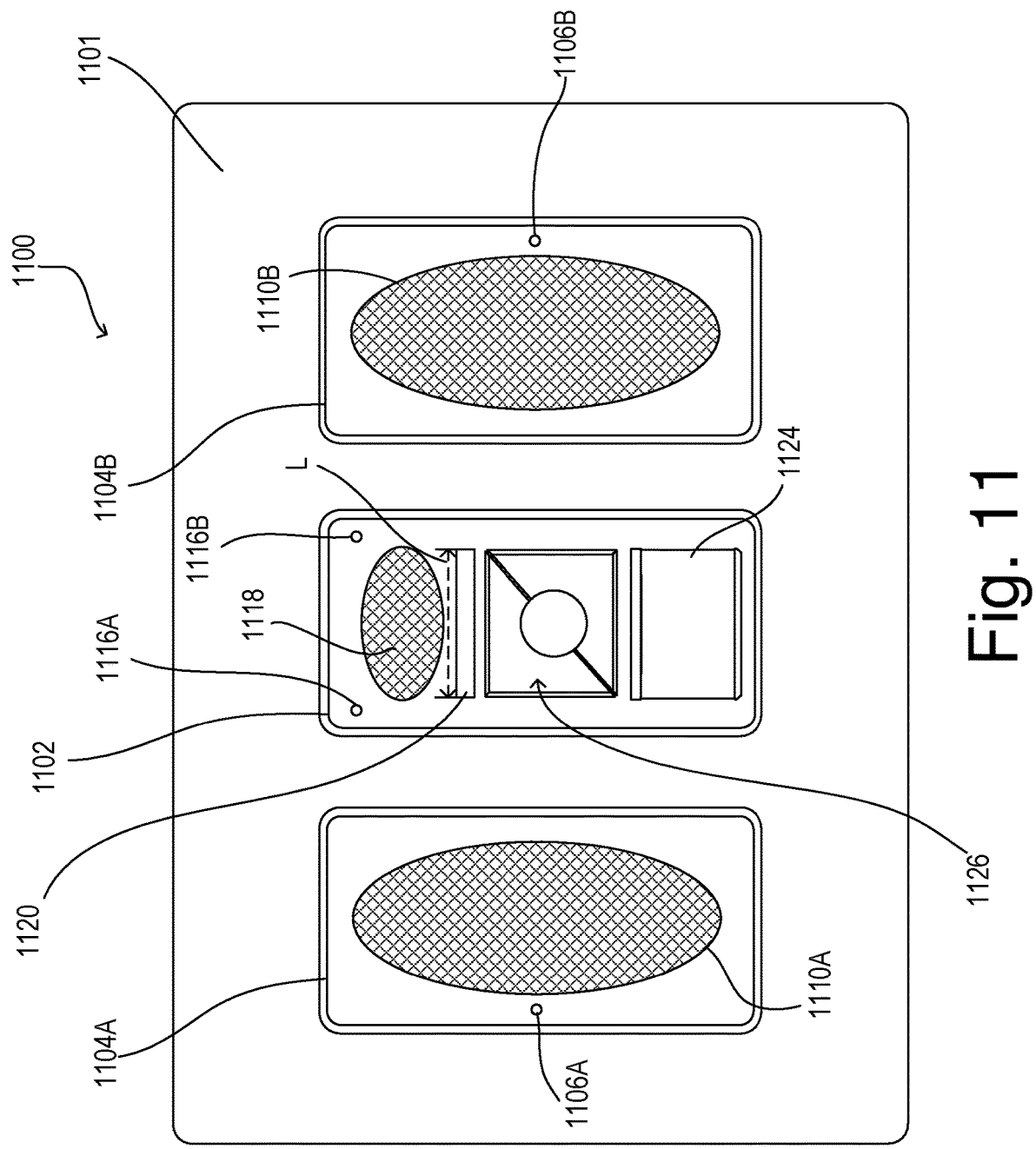
FIG. 11 is an example host and modular device assembly for a voice assistant load control device with stereo speakers.

FIG. 11 shows an alternative embodiment of a host and modular device assembly 1100. The assembly may include a host device 1102 and one or more modular devices 1104A, 1104B, which may be mounted to a wall behind a faceplate 1101, or which may be integral with the faceplate. The faceplate 1101 may be a standard three-gang faceplate, for example, a decorator faceplate which conforms to an ANSI/NEMA standard as previously described. Alternatively, the faceplate may be a custom faceplate, as described in previous embodiments. Further, one will understand that the faceplate may include more than three gangs.

The host device 1102 may have several functions integrated into the device. For example, the host device 1102 may include integrated capabilities of the devices shown in FIG. 8. For example, the host device 1102 may be a voice assistant, similar to the host device 112 of FIG. 5 and FIG. 8. Additionally and/or alternatively, the host device 1102 may be a load control device, such as the load control device 104 of FIG. 8 and/or an occupancy sensor, such as the occupancy sensor 804 of FIG. 8.

The host device 1102 may be installed in an electrical wallbox (not shown) and may be wired to an AC line voltage. For example, the host device 1102 may replace an existing wall control, such as a lighting control device. The host device 1102 may be wired to a hot and a neutral connection in the electrical wallbox. The host device 1102 may further be wired to a switched hot (or dimmed hot) connection in the electrical wallbox for control of an electrical load.

As described, the host device 1102 may be a load control device configured to control one or more electrical loads. The host device 1102 may contain one or more actuators 1126. The actuators may be buttons, for example, and may be configured to receive a user input and control one or more electrical loads based on the received user input. A user may press any of the actuators 1126 to control the one or more electrical loads. For example, the one or more electrical loads may be lighting loads. For example, a user may press one or more of the actuators 1126 to turn the lighting loads on, off, or to dim the lighting loads up or down to increase or decrease the amount of light in the space, respectively. The host device 1102 may control the one or more electrical loads directly, i.e., via the switched hot (or dimmed hot) connection in the electrical wallbox. Alternatively and/or additionally, the host device 1102 may wirelessly control the one or more electrical loads, for example, via an RF command.

The host device 1102 may further contain a sensor 1124. The sensor 1124 may be an occupancy sensor, for example, a PIR sensor, such as the PIR sensor shown in the modular device 900A of FIG. 9A. The occupancy sensor may be used to detect a presence of one or more occupants in a room in which the host device 1102 is installed. When the occupancy sensor 1124 detects that one or more occupants are present in the room, the host device 1102 may control the one or more electrical loads in response to the detection. For example, when the occupancy sensor 1124 detects that the room is occupied (i.e., one or more occupants are present in the room), the host device 1102 may turn on one or more electrical loads. Conversely, for example, when the occupancy sensor 1124 detects that the room is not occupied (i.e., no occupants are present in the room), the host device 1102 may turn off one or more electrical loads. Other examples are possible. For example, the host device 1102 may alternatively control the one or more electrical loads to dim up or dim down.

The host device 1102 may further include a voice assistant. For example, the host device 1102 may have similar features as the voice assistant modular device 112 shown in FIG. 5. The voice assistant of host device 1102 may receive a spoken request from a user via one or more microphones 1116A, 1116B, located on a front surface of the host device 1102. The host device may be configured such that the microphones 1116A, 1116B may coordinate with each other using beam steering. For example, by using two or more input microphones 1116A, 1116B, the host device 1102 may be configured to selectively receive audio signals from a certain angle of the room by electronically steering the acoustic input across a 180-degree receiving angle.

Beam-steering may be used, for example, to reduce acoustic input into the microphones from unwanted noise sources. For example, when only one microphone is used, if a radio is playing at one side of the room, the acoustic noise from the radio may increase an acoustic noise floor received by the microphone. When a user attempts to make a request to the voice assistant, the acoustic noise floor may be high enough that the signal received by the microphone may be lost in the noise. That is, the host device may not be able to distinguish the acoustic signal of the user request from the noise floor, (i.e., from the background noise of the radio). However, if two microphones are used, the host device may use beam-steering of the two microphones. Beam-steering may allow the host device to "steer" the received acoustic beam by electronically selecting acoustic input from a range of angles (up to 180 degrees) in front of the device. For example, beam-steering may be used to minimize the background noise and receive a higher quality audio signal from a user by selectively targeting acoustic input from the angles which do not include the noise source. Beam-steering capabilities may be improved as the distance between microphones 1116A, 1116B is increased.

The host device 1102 may also contain a speaker 1118, similar to the speaker of the modular device 112 shown in FIG. 5 behind protective cover 510. The speaker may be used to communicate with a user and/or to play music, etc., as previously described for the voice assistant modular device 112.

The host device 1102 may include an LED strip 1120. For example, the LED strip may be similar to the LED array 506 of FIG. 5, in that the LED strip 1120 is a linear LED display. Although depicted horizontally, the LED strip 1120 may alternatively be a vertical LED strip, or discrete LED array as shown in FIG. 5. The LED strip 1120 may be used to communicate to a user of the host device 1102 that the host device 1102 has received a user request. For example, the LED strip 1120 may turn on, blink, or strobe, when the host device receives a command or a request from a user. Alternatively and/or additionally, the LED strip 1120 may be used when speaker 1118 is active (i.e., when the speaker is transmitting sound), when the device is muted, and/or to indicate a volume level of the speaker 1118.

The LED strip may have a length L. The length L may be approximately equal to a width of the one or more actuators 1126, and/or a width of the occupancy sensor 1124. The LED strip may additionally have a capacitive or resistive touch area. A user may press an area on the LED strip to adjust the volume of the speaker 1118. Further, the volume level of the speaker 1118 may be indicated by the illuminance of the LED strip 1120. For example, when the volume of the speaker 1118 is at fifty percent of the maximum volume, the LED strip 1120 may be illuminated for half of the length L of the LED strip.

The front surface of the host device 1102 may be accessible to a user through a standard size opening of the faceplate 1101. Due to the size constraints of the standard size opening, the host device 1102 may have a reduced audio quality. For example, the host device 1102 may have a reduced input audio quality due to the close proximity of microphone 1116A to microphone 1116B. That is, the beam-steering and noise rejection capability of the host device may depend on the spacing between the microphone 1116A and the microphone 1116B. As the spacing between the two microphones increases, the noise rejection capability of the host device may increase as the host device and modular assembly may more accurately localize a direction of a noise source. Therefore, the size constraints of the host device 1102 may limit the acoustic input quality of the host device/microphones 1116A, 1116B Additionally, the host device 1102 may have a limited audio output quality. For example, the size constraints may limit the size of the speaker 1118, which may limit the speaker's ability to accurately reproduce low-frequency audio content.

However, these limitations may be overcome by adding one or more modular devices 1104A, 1104B to improve the speaker quality and beam-steering capability of the voice assistant. The modular devices 1104A, 1104B may also be installed with the faceplate 1101. For example, the modular devices 1104A, 1104B may be configured to fit in a standard size opening of the faceplate 1101. Alternatively, the faceplate 1101 may be a custom faceplate with opening sizes larger than a standard size opening, to accommodate a larger modular device 1110A, 1110B.

Each modular device 1104A, 1104B may be installed to the left and right of the host device 1102, respectively. The modular device 1104A may be the same as modular device 1104B, or the modular device 1104A may be a mirror image of the modular device 1104B to maintain a symmetrical visual appearance of the assembly 1100. Alternatively, if the host device 1102 is installed in a two-gang wallbox, the second wallbox gang may be used to accommodate an existing installed device, such as an existing load control device. The modular devices 1104A, 1104B may be installed around the existing load control device. That is, the faceplate 1101 may be a 4 or more gang faceplate to accommodate additional non-audio devices, as will be discussed in greater detail herein.

The modular device 1104A and 1104B may each contain a microphone 1106A, 1106B. The microphones 1106A, 1106B may be used in place of, or as a supplement to, the microphones 1116A, 1116B of the host device 1102. In this way, the distance between the microphones 1106A, 1106B may be more than three times the distance between the microphones 1116A, 1116B, which may greatly enhance the audio input quality.

Additionally, the modular devices 1104A, 1104B may contain one or more speakers 1110A, 1110B. The speakers 1110A, 1110B may be located behind a protective cover or grille, similar to the protective cover 510 shown in FIG. 5. The speakers 1110A, 1110B may have a larger area than the speaker 1118 of host device 1102. For example, the speakers 1110A, 1110B may each be at least three times the area of the speaker 1118. The increase in area of the speakers 1110A, 1110B of the modular devices may provide an increased audio output quality, and in particular at lower frequencies.

Further, the addition of a single modular device 1104A with speaker 1110A to the host device may allow the modular device 1104A and the host device 1102 to provide stereo sound. For example, the speaker 1110A may be used as a left stereo channel, while the speaker 1118 may be used as a right stereo channel. If the modular device 1110B is also present, the speaker 1110A may be used as the left stereo channel, and the speaker 1110B may be used as the right stereo channel. In this case, the speaker 1118 may act as a center channel. In a second example, if only the host device 1102 and modular device 1104B are present, the speaker 1110B may be used as a right stereo channel, while the speaker 1118 may be used as a left stereo channel.

The modular devices 1104A, 1104B may be electrically connected to the host device 1102 through one or more power and communication lines. For example, the modular devices 1104A, 1104B may be electrically connected to the host device 1102 through a power supply bus as described for previous embodiments. Alternatively, for high performance audio modular devices, the modular devices 1104A, 1104B may have their own dedicated power supply. That is, the modular devices 1104A, 1104B may be installed in an electrical wallbox and powered via a line voltage power connection.

In addition to a power and a ground connection, the power supply bus may further contain one or more communication connections, for example, a clock line and a data line. The communication connections may be digital audio connections. The host device 1102 may provide power to the modular devices 1104A, 1104B as described in previous embodiments. Further, the host device 1102 may communicate, that is, may transmit and receive audio data to and from the modular devices 1104A, 1104B.

The number and type of communication connections may depend on a protocol used, and further may depend on whether or not microphones 1106A, 1106B are present on the modular devices. For example, the host device may communicate with the modular devices 1104A, 1104B using dedicated communication wires. For example, a first communication wire for the speaker 1110A, and a second communication wire for the speaker 1110B. If the modular devices 1104A, 1104B contain microphones, the host device may further have a third communication wire for the microphone 1106A, and a fourth communication wire for the microphone 1106B.

Alternatively, fewer communication lines may be used if the modular devices 1140A, 1104B contain a processor capable of communicating via a protocol. In this case, the host device 1102 may communicate with the modular devices 1104A, 1104B using one of a number of standard protocols. The number of communication lines between the host device 1102 and modular devices 1104A, 1104B may be defined by the protocol used. For example, the protocol may be an inter-IC sound (I2S) protocol. The I2S protocol may use three communication connections: a bit clock line, a word clock line, and at least one data line. The digital audio data may be communicated via the communication connections using a or pulse code modulation (PCM) format. Alternatively, other protocols and modulation formats may be used. For example, a serial peripheral interface (SPI) protocol and/or a pulse density modulation (PDM) format may be used. For example, the PDM format may place inbound data (i.e., microphone data) and outbound data (i.e., speaker data) on opposite edges of a clock line. Other examples are possible.

Similarly as described for modular device 112 of FIG. 2, the modular devices 1104A, 1104B may be installed in front of a wall adjacent to the electrical wallbox in which the host device 1104 is installed. This may simplify the installation process for retrofit applications by allowing a user to install the additional modular devices without cutting a hole in the wall and adding an additional wallbox. However, installing the modular devices 1104A, 1104B in front of the wall may limit the depth of the modular devices behind the faceplate 1101. For high performance applications, one will understand that the modular devices may alternatively be recessed into the wall. For example, the modular devices 1104A, 1104B may be installed in a recessed area of the wall, or alternatively, may be installed in an electrical wallbox along with the host device 1102.

Figure 12A:
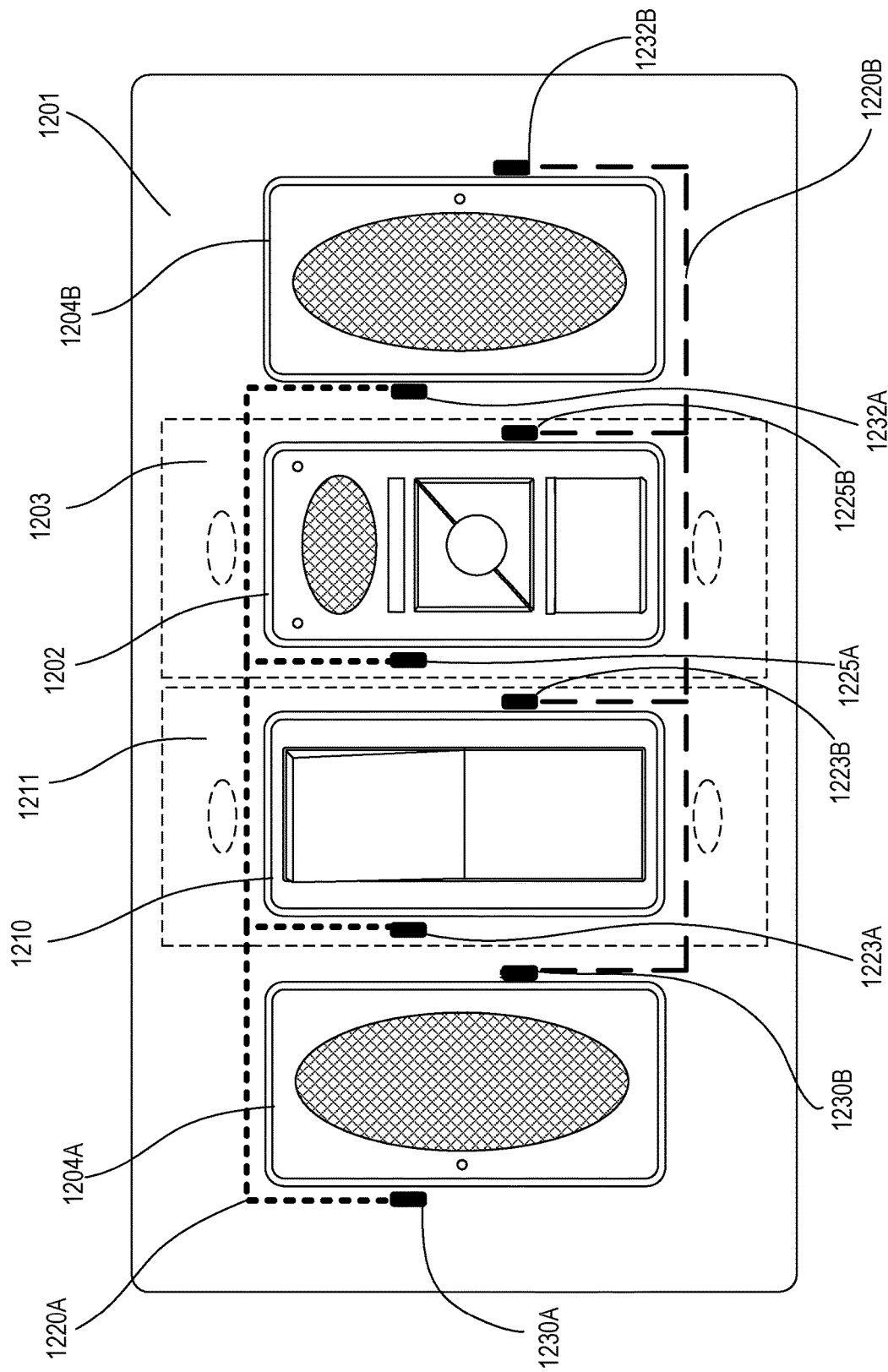
FIGS. 12A, 12B are transparent front views of an example multi-gang installation of a host device and modular device assembly similar to FIG. 11, with an additional load control device.
Figure 12B:
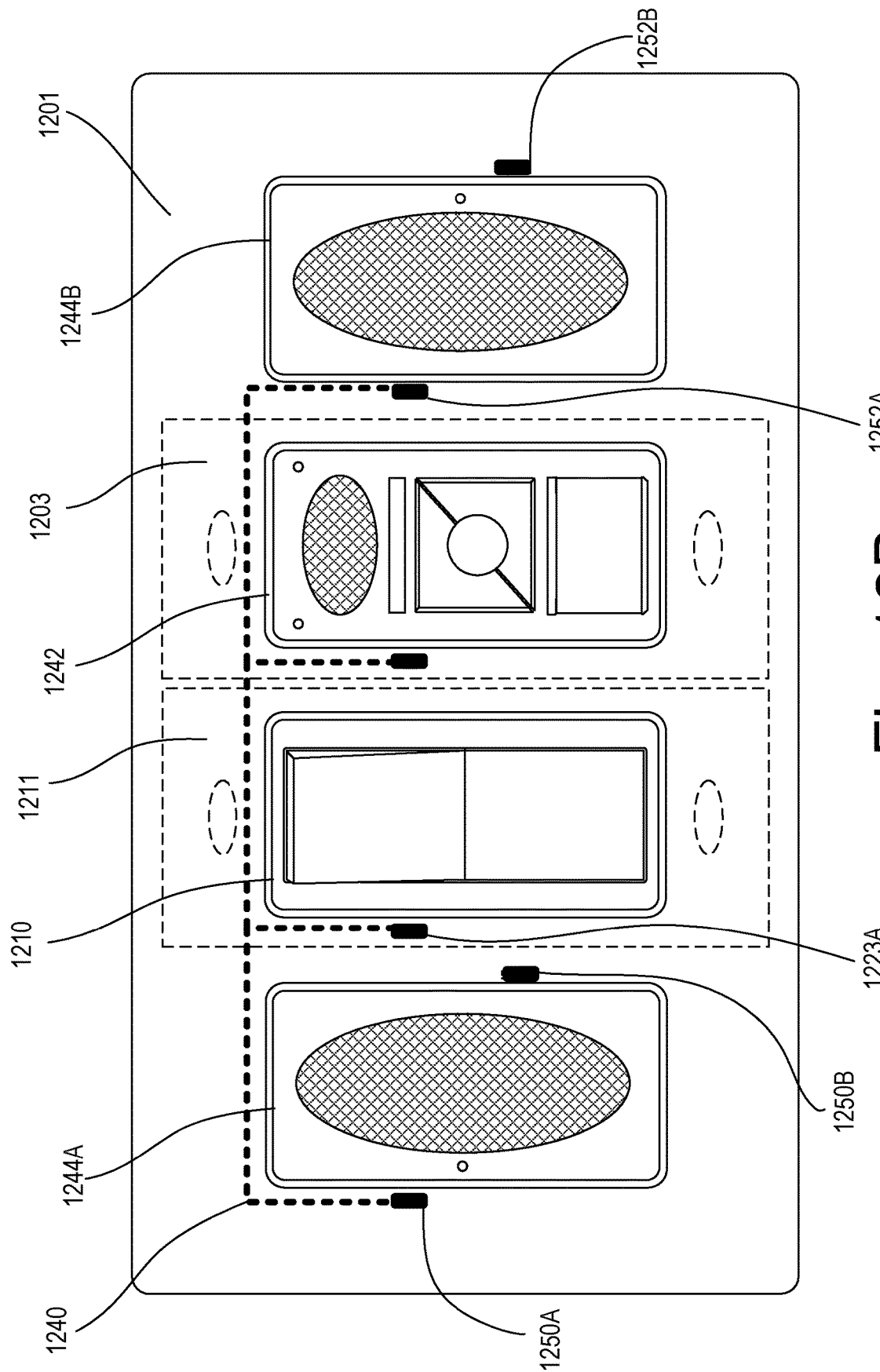

FIGS. 12A, 12B each depicts an example host device and modular assembly built around an additional load control device and installed behind a faceplate 1201. The faceplate 1201 is shown in a transparent view. The host device and modular assembly of FIG. 12A may include the host device 1202 and modular devices 1204A, 1204B. For example, the host device 1202 and modular devices 1204A, 1204B may be the same as, or similar to, the host device 1102 and modular devices 1104A, 1104B of FIG. 11. The host device 1202 may be installed in an electrical wallbox via a mounting yoke 1203. A load control device 1210 may be adjacent to a left side of the host device 1202 and may also be installed in the electrical wallbox via a mounting yoke 1211.

The modular device 1204B may be installed adjacent to a right side of the host device 1202 and may be configured as a right-channel speaker. The modular device 1204A may be located on a left side of the host device 1202, and may be configured as a left-channel speaker. The modular device 1204A may further be installed adjacent to the load control device 1210. That is, the modular device 1204A may be spaced apart from the host device 1202 by a single gang. The modular devices 1204A, 1204B may be installed in front of the wall, that is, the modular devices 1204A, 1204B may not be installed in the electrical wallbox with the host device 1202 and the load control device 1210. Installing the modular devices 1204A, 1204B in front of the wall may greatly simplify the installation process.

The host device and modular devices, along with the load control device 1210, may each be covered by a faceplate or wallplate 1201. The faceplate 1201 may be a four gang faceplate, as shown in this example. As previously described, the faceplate 1201 may be a standard faceplate. For example, the faceplate 1201 may be a standard 4-gang decorator opening faceplate.

The host device 1202 may be connected to each of the modular devices 1204A, 1204B via a first and second power and communications bus 1220A, 1220B. For example, the host device 1202 may have two terminals, a first terminal which connects via a mating terminal 1225A of bus 1220A to thus connect to the power and communications bus 1220A, and a second terminal which connects via a mating terminal 1225B of bus 1220B to thus connect to the power and communications bus 1220B. The first and second terminals of the host device may be used as left- and right-channel speaker communications. For example, the power and communications bus 1220A may be used for dedicated left channel speaker communications and the power and communications bus 1220B may be used for dedicated right channel speaker communications.

For example, the power and communications bus may comprise a first power and communications bus 1220A, which may provide communications between the host device 1202 and the left channel speaker and microphone of modular device 1204A. The power and communications bus may further include a second power and communications bus 1220B, which may provide communications between the host device 1202 and the right channel speaker and microphone of the modular device 1204B. The left- and right-channel speaker communications may be an analog or a digital transmission. The power and ground connections may be present on either or each communication bus 1220A, 1220B, for example, or a separate power and ground connection bus may be provided.

The power and communication bus may have one or more terminals located at each gang of the faceplate. For example, the modular devices 1204A, 1204B may connect to the power supply and communication bus 1220A, 1220B via the respective mating terminals 1230A, 1232B of the bus. For example, the modular devices 1204A, 1204B may each comprise a terminal (not shown) which may contact the mating terminal 1230A, 1232B, respectively. According to one example, the additional mating terminal 1230B of the power and communication bus 1220B and the additional mating terminal 1232A of the power and communication bus 1220A may not be connected to the modular devices 1204A, 1204B. That is, the modular devices 1204A, 1204B may only have a single terminal to connect with either of the power and communication bus 1220A or 1220B.

Additionally, the power and communication bus 1220A, 1220B may each have a terminal 1223A, 1223B, respectively, which may be located at a gang in the faceplate 1201 where the load control device 1210 is installed. However, the load control device may not have a mating terminal to connect with the terminals 1223A, 1223B. That is, the load control device 1210 may not be configured to connect to the power and communications bus 1220A or 1220B. As such, the terminals 1223A, 1223B may not be connected to the load control device 1210. Alternatively, the terminals 1223A, 1223B may be removable terminals. For example, a user may remove the unused terminals 1223A, 1223B from the power and communications bus 1220A, 1220B.

The power and communication buses 1220A, 1220B may each be connected to the faceplate 1201, or may be separate from the faceplate 1201 as previously described. Additionally or alternatively, the faceplate 1201 may be a custom faceplate with the power supply and communication bus 1220 connected to, adhered to, or otherwise integrated with, the faceplate 1201, as previously described.

The modular devices 1204A, 1204B may be the same modular devices. For example, the left modular device 1204A may be installed in a first vertical orientation, while the right modular device 1204B may be the same as left modular device 1204A, and installed in a second reverse vertical orientation. That is, modular device 1204B may be oriented in a 180 degrees rotation with respect to the modular device 1204A. To accommodate the multiple orientations of the modular devices, the terminal of each of the modular devices 1204A, 1204B may contact either the mating terminal 1230A, 1232A, respectively, of the power and communication bus 1220A or the mating terminal 1230B, 1232B, respectively, of the power and communication bus 1220B.

The connection of the terminal of each respective modular device 1204A, 1204B to either the power and communication bus 1220A or 1220B may determine whether the modular device is configured as a left- or right-channel speaker. For example, the terminal of modular device 1204A, which may be connected to the power and communication bus 1220A via the mating terminal 1230A, may cause the modular device 1204A to be configured as a left channel speaker, whereas the terminal of modular device 1204B, which may be connected to the power and communication bus 1220B via the mating terminal 1232B, may cause the modular device 1204B to be configured as a right channel speaker. For example, the modular devices 1204A, 1204B may be configured as left- or right-channel speakers by virtue of the communications transmitted from the host device 1202 via the respective left- and right-channel dedicated power and communication buses 1220A, 1220B. That is, the host device 1202 may transmit left channel speaker communications via the power and communications bus 1220A, and may further transmit right channel speaker communications via the power and communications bus 1220B, as previously described. FIG. 12B is an alternate example configuration of modular devices 1244A, 1244B with the host device 1242, which may be similar to the modular devices 1204A, 1204B and host device 1202 shown in FIG. 12A. Unlike FIG. 12A, the assembly shown in FIG. 12B may have only a single power and communications bus 1240.

As shown in FIG. 12B, the modular devices 1244A, 1244B may each have two terminals, while the host device 1242 may have a single terminal. For example, in addition to the power terminal (not shown) configured to connect to mating terminal 1250A of the bus 120 on the left-hand side of the modular device 1244A, which is connected to the terminal of the power supply and communication bus 1240, the modular device 1244A may further have an unused mating terminal 1250B located on the right-hand side of the modular device. For example, the unused mating terminal 1250B may be used to connect the to the power supply and communication bus 1240 if the modular device 1244A was oriented in 180 degrees of rotation from the depicted orientation. For example, the modular device 1244B may have a terminal 1252B in the same location as the unused mating terminal 1250B of modular device 1244A. However, as modular device 1244B is oriented in 180 degrees of rotation from modular device 1244A, the terminal of modular device 1244B may be connected to the power supply and communication bus 1240 via the mating terminal 1252A. Further, the terminal 1252B may correspond to the terminal 1250A of modular device 1244A, which is connected to the power supply and communication bus 1240 in modular device 1244A, but in the rotated modular device 1244B, terminal 1252B appears as an unused mating terminal.

The modular devices 1204A, 1204B may be configured to detect which terminal of the two terminals (1230A, 1232A for modular device 1204A, and 1230B, 1232B for modular device 1204B) is connected to the power supply and communication bus 1220. In response to detecting which terminal is connected to the power supply and communication bus 1220, the modular device may determine its orientation, and based on its orientation, whether the modular device should be configured as a left- or right-stereo speaker.

The communication between each of the modular devices 1244A, 1244 and the host device 1242 may use digital signals. For example, the digital communication signals may contain data which may be time spliced between the left and right channel data. For example, an I2S protocol may be used, as previously described. Further, the host device 1242 may only need a single terminal to connect to the modular devices 1250A, 1250B via the power supply and communication bus 1240.

Other examples are possible. For example, the modular devices 1204A, 1204B, 1244A, 1244B may only have a single terminal and may be programmed or otherwise configured to detect whether the modular device should be configured as a left- or right-channel speaker.

One will understand that the host device 1202 and 1242 shown in FIGS. 12A, 12B is for example purposes only, and further that the host device 1104 of FIG. 11 is for example purposes only, are none of these devices are limited to the components shown in FIG. 11 or 12, but may rather include additional components or few components than shown. For example, the host device 1202/1242 may also include a daylight sensor, an airgap actuator, etc. Further, this embodiment may be combined with the smart faceplate embodiment. For example, any of the components, such as the microphones 1106A, 1106B shown in FIG. 11 may be integrated into the faceplate 1101, which may allow the microphones 1106A, 1106B to have an even greater distance between them, which may further increase the quality of the audio input.

Figure 13A:
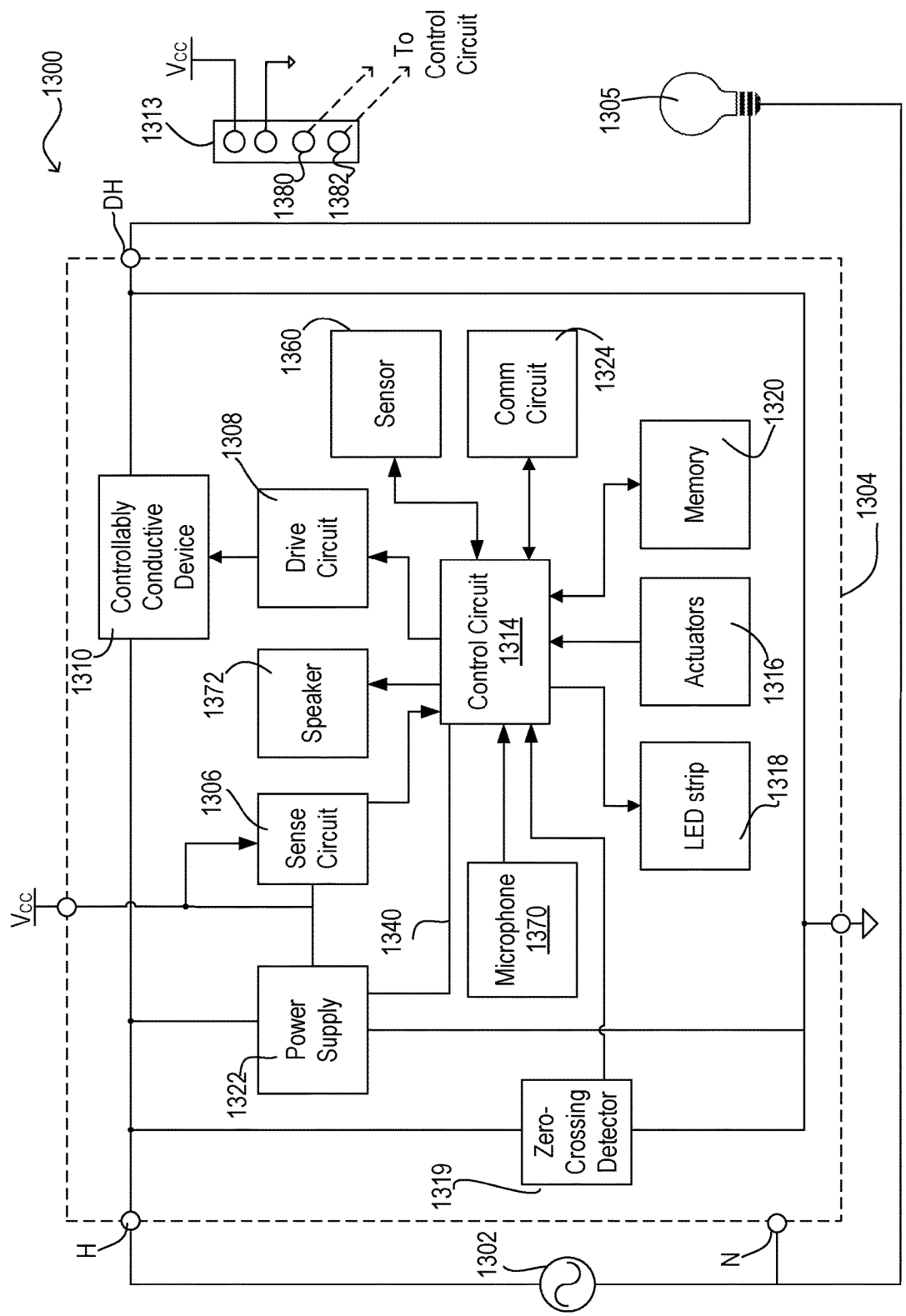
FIGS. 13A and 13B are an example block diagrams of the host device and modular speaker devices, respectively, of FIGS. 11 and 12A, 12B.

FIG. 13A is an example block diagram of a host device 1300 which may control electrical loads, contain a voice assistant, and include occupancy sensing, such as the host device 1102 of FIG. 11 or 1202 of FIG. 12A or 1242 of FIG. 12B. The host device 1300 may contain similar components as the host device and modular device shown in FIG. 4 and FIG. 6. For example, the host device 1300 may receive power from a line voltage power supply 1302 via a hot connection H and a neutral connection N, similar to FIG. 4. The device 1300 may further contain a dimmed hot control terminal DH which may be connected to an electrical load, such as a lighting load 1305, similar to FIG. 4. Also as in FIG. 4, the host device 1300 may contain a control circuit 1214, a communication circuit 1224, a zero crossing detector 1319, a power supply 1322 connected to the control circuit 1314 via a connection 1340, a sense circuit 1306 on a $V_{CC}$ rail, one or more actuators 1316, a memory 1320, a controllably conductive device 1310 connected via a drive circuit 1308 to the control circuit 1314, and a power terminal 1313. The components discussed may be the same as, or similar to, the components 402-440 as shown and described in FIG. 4.

The host device 1300 may additionally include voice assistant components, similar to the voice assistant components shown and described in FIG. 6. For example, the host device 1300 may include a speaker 1372 and one or more microphones 1370. The speaker 1372 and the one or more microphones 1370 may be similar to, or the same as, the speaker 610 and microphone 604 as shown and described in FIG. 6.

In addition to including a voltage $V_{CC}$ and a ground contact, the power terminal 1313 may further include two or more communication contacts 1380, 1382. The communication contacts/lines 1380, 1382 may be used to communicate between the host device 1300 and one or more modular microphone/speaker devices. For example, the host device may receive microphone input from the one or more modular devices via one or more of the communication contacts/lines 1380, 1382. Additionally, the host device may transmit speaker output, such as a left and a right stereo output, respectively, via the communication contacts/lines 1380, 1382. For example, the communication contacts/lines may be a clock line and a data line.

For example, the control circuit 1314 may be a control circuit from the STM32F76 family, manufactured by STMicroelectronics. The control circuit 1314 of the host device 1300 may be configured to communicate with one or more modular devices via an I2S protocol, as previously described. The control circuit 1314 may further be configured to process acoustic data. The control circuit 1314 may process all acoustic data local to the host device 1300 (that is, processed by the control circuit 1314), or the control circuit 1314 may process a minimal amount of data and may rely on a remote server for additional processing. For example, the host device may be configured to respond to a voice command only when a starting wake word is used. For example, the control circuit 1314 may be configured to process acoustic data to detect the wake word. Upon detecting the wake word, the control circuit 1314 may transmit the acoustic data via the communication circuit 1324 to a remote server for additional voice processing. The communication circuit 1324 may be a separate circuit than the control circuit 1314, or may be integrated with the control circuit 1314. The communication circuit may transmit the acoustic data via any one of the following wireless protocols: Wi-Fi, Bluetooth®, or the like. Alternatively, one will understand that the host device may have a wired connection to a router or a server for remote acoustic processing.

The communication circuit 1324 may receive a response to the processed acoustic data from a remote server and may send the response to the control circuit 1314. The control circuit 1314 may then determine, based on an audio configuration, which speakers to transmit the response to. For example, the audio configuration may include the modular devices 1204A, 1204B configured as left- and right-stereo speakers, with the speaker of the host device configured as a center channel speaker. The control circuit 1314 may transmit the response to the speaker 1372 of the host device, and to the corresponding speakers of the modular devices 1204A, 1204B of FIG. 12A and 1244A, 1244B of FIG. 12B.

The control circuit 1324 of the host device 1300 may further be used for beam steering or beam-forming of the microphones 1370, and/or one or more microphones of the modular devices, as previously described. For example, the control circuit may receive acoustic input from the microphones of the modular devices. The control circuit 1324 may compare the input from the microphones of the modular devices to determine the direction of the sound source. The control circuit 1324 may then use one or more beam-steering or beam-forming algorithms to steer the acoustic input towards the sound source, for example.

The host device 1300 may further contain an LED strip 1318. The LED strip may be configured to illuminate a length of LEDs to communicate information about the voice assistant to a user. For example, as previously described, the LED strip 1318 may be configured to communicate status information (listening state vs. muted), volume information, such as a volume level, etc.

The host device 1300 may also have a sensor 1360. For example, the sensor 1360 may be an occupancy sensor, such as a PIR sensor 1124 of FIG. 11. The sensor 1360 may be operably connected to the control circuit 1314. The sensor 1360 may be configured to sense an occupancy signal in the space, for example, an infrared heat signature, and may transmit the occupancy signal to the control circuit. The control circuit 1314 may receive the occupancy signal and determine whether or not the space is occupied based on the received occupancy signal. Based on the determination, the control circuit 1314 may control one or more electrical loads, for example, electrical load 1305. For example, when the control circuit 1314 determines based on the sensor 1360 that the space is occupied, the control circuit 1314 may be configured to turn on the electrical load 1305. The control circuit 1314 may turn on the electrical load 1305 by providing a signal to the drive circuit 1308 to control the controllably conductive device 1310 to provide power to the electrical load 1305 from the line voltage power source 1302. Although the electrical load 1305 is depicted as a lighting load, for example, a light bulb, one will understand that the electrical load may be any electrical load, such as a fan, electrical outlet, etc.

Figure 13B:
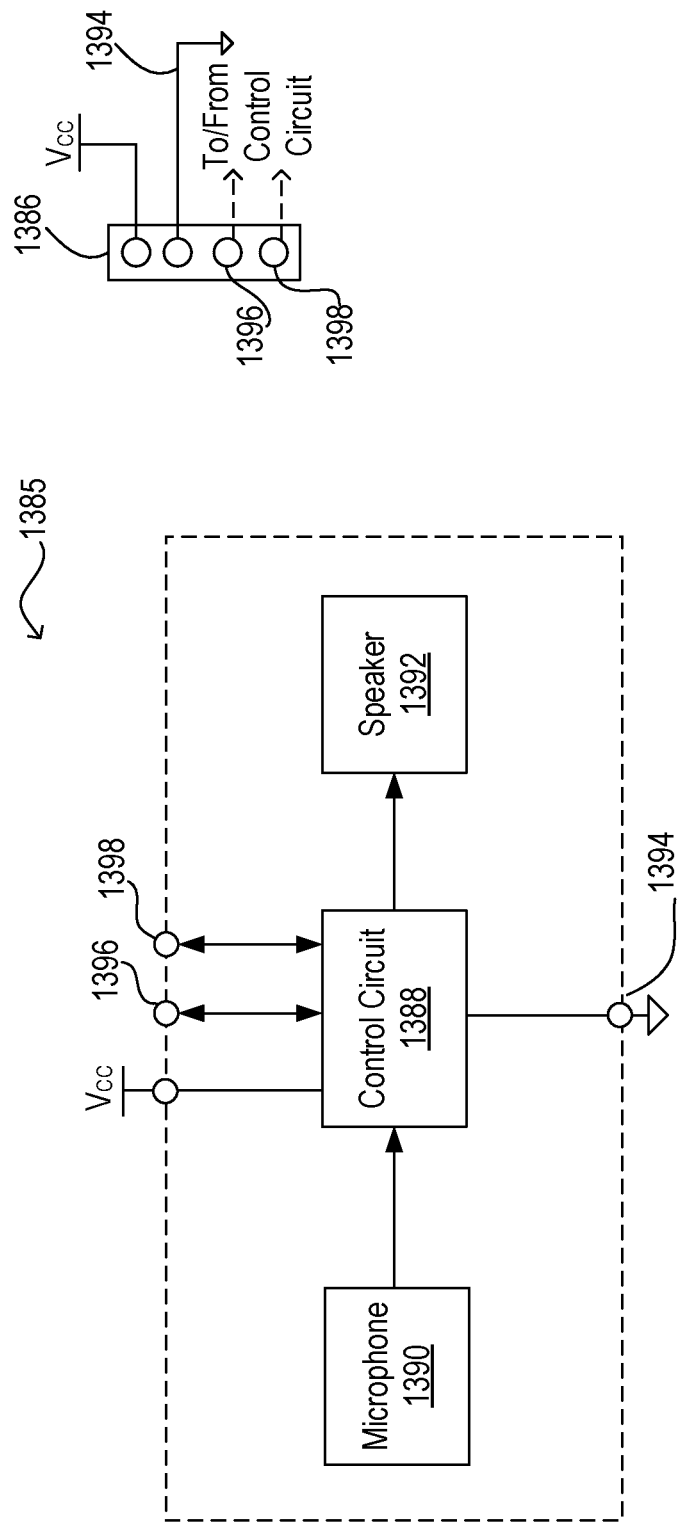

FIG. 13B is an example block diagram of a modular device 1385 with a speaker and microphone, such as the modular device 1104A and 1104B shown in FIG. 11. The modular device 1385 may have one or more power supply terminals 1386 configured to connect to a power supply bus. For simplicity, the power supply terminal 1386 is shown as a single power supply terminal, although a second power supply terminal in parallel electrical connection may also be included. The power supply terminal 1386 may contain at least one of a power contact $V_{CC}$ and a ground contact 1394. The power contact $V_{CC}$ and ground contact 1394 may provide power to the modular device 1385 from a host device, such as the host device 1102 of FIG. 11. The power supply terminal 1386 may further contain one or more communication contacts, shown here as communication contacts 1396, 1398. The communication contacts may be used to transmit and receive audio data, or other communications, to one or more host devices.

The modular device 1385 may contain a control circuit 1388. The control circuit 1388 may be in electrical communication with at least one microphone 1390 and at least one speaker 1392 of the modular device 1385. The control circuit 1388 may receive power from the power terminal 1386 via the power contact $V_{CC}$. The control circuit 1388 may further be connected to the one or more communication contacts 1396, 1398 on the power supply terminal 1386. The communication contact(s) 1396, 1398 may be used to communicate between the control circuit 1388 of the modular device 1385 and a control circuit of the host device, such as control circuit 1314 of the host device 1300 shown in FIG. 13A. For example, the modular device 1385 may communicate with a host device using an I2S or an I2C protocol. The control circuit 1388 of the modular device 1385 may communicate via the I2S protocol, for example, with one or more host devices. The control circuit 1388 may further contain a speaker driver and a codec for encoding and/or decoding audio data. One example control circuit that may be used is the TFA9892 manufactured by NXP Semiconductors.

Additionally, although the communication contacts/lines are shown here as two communication contacts, one will understand that the number of communication contacts may be dependent upon a communication protocol used, as previously described. For example, in the simplest configuration, the modular device 1385 may not include a control circuit 1388, but rather the microphone 1390 and the speaker 1392 may each be directly connected to one of the communication contacts 1396, 1398, respectively. Further, although not shown, the microphone 1390 and/or the speaker 1392 may receive power from the power rail $V_{CC}$. For example, the speaker 1392 may have an integrated amplifier to boost the sound power output, which requires a power supply. In another example, the modular device 1385 may have a dedicated line-voltage power supply for the speaker 1392. Other examples are possible.

While this disclosure has been described in terms of certain embodiments and generally associated methods, alterations and permutations of the embodiments and methods will be apparent to those skilled in the art. For example, the embodiments disclosed herein are not limited to known faceplate structures, but may further include custom designs, including wherein the host and/or modular devices may be stacked vertically on top of one another, or in any other combination or configuration. Accordingly, the above description of example embodiments does not constrain this disclosure. Other changes, substitutions, and alterations are also possible without departing from the spirit and scope of this disclosure.

The invention claimed is:

1. A faceplate configured to be installed on a wall and installed over one or more electrical devices, the faceplate comprising:
   a front side that is visible when the faceplate is installed on the wall;
   a back side opposing the front side and that is configured to be adjacent to the wall when the faceplate is installed on the wall;
   a first opening configured to receive a host device;
   a second opening configured to receive a modular device; and
   a first terminal proximate the first opening device and configured to electrically connect with the host device for receiving power from a power supply of the host device;
   a second terminal proximate the second opening and configured to electrically connect with the modular device for supplying power to the modular device from the power supply of the host device; and
   a power supply bus electrically connected to the first terminal and the second terminal;
   wherein the power supply bus is configured to carry power from the first terminal to the second terminal to provide power from the power supply of the host device to the modular device; and
   wherein the first terminal and the second terminal are connected to the back side of the faceplate such that the first terminal, the second terminal, and the power supply bus are not visible from the front side of the faceplate when the faceplate is installed on the wall.

2. The faceplate of claim 1, further comprising a plurality of holes configured to receive respective screws for attaching the faceplate to the wall.

3. The faceplate of claim 1, wherein the first and second terminals each comprises a conductive pad.

4. The faceplate of claim 1, wherein the first and second terminals each comprises a female connector.

5. The faceplate of claim 1, wherein the first and second terminals are electrically connected via one or more wires.

6. The faceplate of claim 1, wherein the first and second terminals are electrically connected via a printed circuit board trace.

7. The faceplate of claim 1, wherein the first and second terminals each have a first contact.

8. The faceplate of claim 7, wherein the power supply bus places the first contact of the first terminal in electrical connection with the first contact of the second terminal.

9. The faceplate of claim 8, wherein the first and second terminals each further comprises a second contact, wherein the power supply bus places the second contact of the first terminal in electrical connection with the second contact of the second terminal.

10. The faceplate of claim 9, wherein the second contact of each of the first and second terminals is not electrically connected to the first contact of each of the first and second terminals.

11. The faceplate of claim 9, wherein the first contact of the first terminal comprises a power contact and the second contact of the second terminal comprises a ground contact.

12. The faceplate of claim 11, wherein the first and second terminals each further comprises a third contact, wherein the power supply bus places the third contact of the first terminal in electrical connection with the third contact of the second terminal, and wherein the third contact of the first terminal, the third contact of the second terminal, and the power supply bus are configured to provide a communication bus between the host device and the modular device.

13. The faceplate of claim 1, wherein the faceplate comprises a solar cell connected to the power supply bus for providing power to the power supply bus.

14. The faceplate of claim 1, wherein the faceplate comprises an occupancy sensor.

15. The faceplate of claim 1, wherein the faceplate comprises a dock configured to hold and charge a battery-powered device.

16. The faceplate of claim 15, wherein the dock further comprises an inductive coil located on the back side of the faceplate for wirelessly charging the battery-powered device;
   wherein the inductive coil is electrically connected to a power converter; and
   wherein the power converter is configured to receive a direct current from the bus supply and output an alternating current to the inductive coil.

17. The faceplate of claim 15, wherein the dock further comprises a charging plug electrically connected to the power supply bus for providing power from the power supply of the host device to the charging plug.

18. A system comprising:
   a first device comprising a speaker; and
   a second device configured to be installed in an electrical wallbox, the second device comprising:
      an AC to DC power supply;
      a control circuit;
      a wireless communication circuit operably connected to the control circuit;
   wherein the second device is electrically connected to the first device via at least a power contact, a ground contact, and a data contact; and
   wherein the second device is configured to:
      provide power, via the AC to DC power supply, to the first device via the power and the ground contacts;
      receive, via the wireless communication circuit, wireless audio data; and
      transmit the received audio data to the speaker of the first device via the data connection.

19. The system of claim 18, wherein the second device is a load control device configured to control an electrical load.

20. The system of claim 18, wherein the second device further comprises a speaker and a microphone.

21. The system of claim 18, further comprising a third device, wherein the third device comprises a speaker.

22. The system of claim 21, wherein the second device is configured to transmit audio data comprising stereo to the respective speakers of the first and third devices, wherein the first device and the third device are configured as left and right stereo speakers.

23. The system of claim 22, wherein the second device comprises a speaker, where in the speaker of the second device is configured as a center channel speaker.

24. The system of claim 22, wherein the first and third devices further comprise a microphone, respectively, and wherein the second device is configured to receive audio data via the data connection from the respective microphones of the first and third devices.

25. The system of claim 24, wherein the second device is configured to perform beam-forming of the audio data received from the respective microphones of the first and third devices.

26. The system of claim 25, wherein the second device is further a load control device configured to control power to an electrical load.

* * * * *